United States Patent [19]

Scalf et al.

[11] 4,420,669

[45] Dec. 13, 1983

[54] DATA INPUT APPARATUS FOR MICROWAVE OVEN CONTROLLERS

[75] Inventors: Gerald W. Scalf, Johnson City, Tenn.; James H. Koberlein, Georgetown, Tex.

[73] Assignee: Texas Instruments Incorporated, Dallas, Tex.

[21] Appl. No.: 335,023

[22] Filed: Dec. 28, 1981

Related U.S. Application Data

[63] Continuation-in-part of Ser. No. 273,294, Jun. 15, 1981, abandoned.

[51] Int. Cl.³ .......................... H05B 6/68; G08C 9/00
[52] U.S. Cl. ...................... 219/10.55 B; 219/10.55 R; 219/506; 340/365 S; 340/706
[58] Field of Search ................. 219/10.55 B, 10.55 R, 219/492, 493, 506; 340/365 R, 365 C, 365 S, 365 VL, 706, 712, 753, 754; 307/117

[56] References Cited

U.S. PATENT DOCUMENTS

| | | | |
|---|---|---|---|
| 4,015,254 | 3/1977 | Strandt | 340/365 R X |
| 4,247,845 | 1/1981 | Schmidt et al. | 340/365 R |
| 4,328,408 | 5/1982 | Lawson | 219/10.55 B |
| 4,367,387 | 1/1983 | Tachihara et al. | 219/10.55 B |

OTHER PUBLICATIONS

Finkel, "Man-Machine Interactions", Computer/Aided Experimentation: Interfacing to Minicomputers, Chapter 16, pp. 326, 327, 339 and 340; Copyright 1975 Published by Wiley & Sons, Inc.

Primary Examiner—B. A. Reynolds
Assistant Examiner—Philip H. Leung
Attorney, Agent, or Firm—John A. Haug; James P. McAndrews; Melvin Sharp

[57] ABSTRACT

An oven controller having a microprocessor for a microwave oven has a first dial for entering time cook data in one embodiment and time or temperature cook data in other embodiments and a second dial for entering duty cycle power data. Analog signals are derived from the dials which are converted into digital signals for entering into the processor using either discrete components, separate integrated circuits or the microprocessor itself. A servo mechanism is shown in one embodiment to rotate the dials in a prescribed manner to display cook data in either time remaining or actual temperature. In other embodiments a digital display is used to provide this information.

3 Claims, 20 Drawing Figures

DATA INPUT APPARATUS FOR MICROWAVE OVEN CONTROLLERS

RELATED APPLICATION

This is a continuation-in-part of application Ser. No. 273,294 filed June 15, 1981, now abandoned.

The subject matter of this application is also contained in application Ser. No. 335,022 by Gerald W. Scalf, a continuation-in-part of application Ser. No. 274,017, now abandoned.

BACKGROUND OF THE INVENTION

FIELD OF THE INVENTION

This invention relates to oven controllers for controlling temperature, time and duty cycle. More specifically, it relates to the inputting of data to microprocessor based digital electronic circuits.

Over the years conventional home cooking ovens have employed simple electromechanical control devices generally comprising a rotatable knob to set a selected temperature. Another rotatable knob was frequently provided to provide a timing function either to provide a audible signal denoting completion of the selected period of time or to automatically turn off power to the oven at that time.

With the advent of the microwave oven, the problem of controlling the operation became somewhat more complex. That is, in microwave ovens it is desirable to vary the duty cycle of the magnetron which produces the microwaves for cooking for different comestibles or for defrosting or reheating as opposed to cooking. Initially this was accomplished by referring to a cookbook provided by the oven manufacturer to obtain a listed duty cycle and then by setting a dial according to the listed duty cycle.

More recently microwave oven controllers have utilized microprocessor based digital electronic circuits in which control data or parameters such as time, temperature and duty cycle are set by appropriate commands entered through a capacitive touch plate or keyboard. These have proven to be very effective however such capacitive touch plates and associated interface apparatus are inherently relatively expensive. It has been proposed to use dial or slide controlled digital encoders, for example, a wiper rotated by a dial so that it can make contact with different weighted lines on a circuit board to input cook data to a microprocessor based controller however this approach is not only relatively expensive compared to electromechanical timers and the like it also uses more control lines of the microprocessor than is desired. Another disadvantage of employing digital encoders is that in order to provide the necessary contacts that would be required in a full dial rotation of 360 degrees, the device would be either too large or the individual conductive lines would have to be too small to be practical for production. Thus there remains a need to provide the same control function for less cost so that a greater number of households can afford such ovens. That is, there is a need for an electronic controller which is economically competitive with electromechanical devices such as timing motors while performing comparable or improved functions.

BRIEF SUMMARY OF THE INVENTION

In accordance with the invention a microwave oven controller having digital electronic processing means such as a microprocessor is provided with dial inputs by connecting the dials to potentiometers each of which forms with a fixed resistor a voltage divider. The voltage generated by the divider is inputed to a comparator which is also inputted by a digital to analog converter. The output of the comparator is then inputted to the microprocessor to provide a digital signal representative of time or temperature data from one dial and power level from another dial. Resistive means is coupled with the converter to automatically put the control in the temperature mode when a temperature probe is inserted into the oven and another resistive means coupled with the converter is used to shift the level of the converter to provide greater accuracy in a selected range of data values.

A servo mechanism using a suitable motor such as a permanent magnetic direct current motor or a bidirectional solenoid, can be attached to the dial to rotate it under control of the microprocessor to provide a display of time remaining of the cook cycle or of actual temperature when in the temperature mode. Alternatively, a digital display is employed in several embodiments to provide this information.

It is an object of this invention to provide a very low cost data input mechanism for a microprocessor based controller. Another object is the provision of such an input mechanism which is simpler to operate than conventional keyboard input devices. Yet another object is to provide a suitable display to reflect cook data to a user including data representation of either time remaining in a cooking cycle or actual temperature.

DETAILED DESCRIPTION OF THE INVENTION

Figure 1:
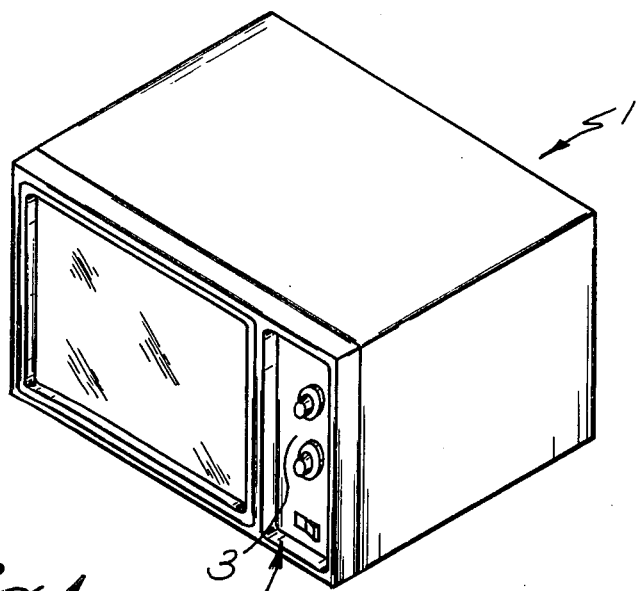
FIG. 1 is a perspective view of the oven assembly containing the oven controller.

FIG. 1 illustrates an oven 1 having a controller 2 with a data input panel 3. A seen in FIG. 2, data input panel 3 comprises first and second dials or knobs 4 and 5 and a switch 6.

Figure 3:
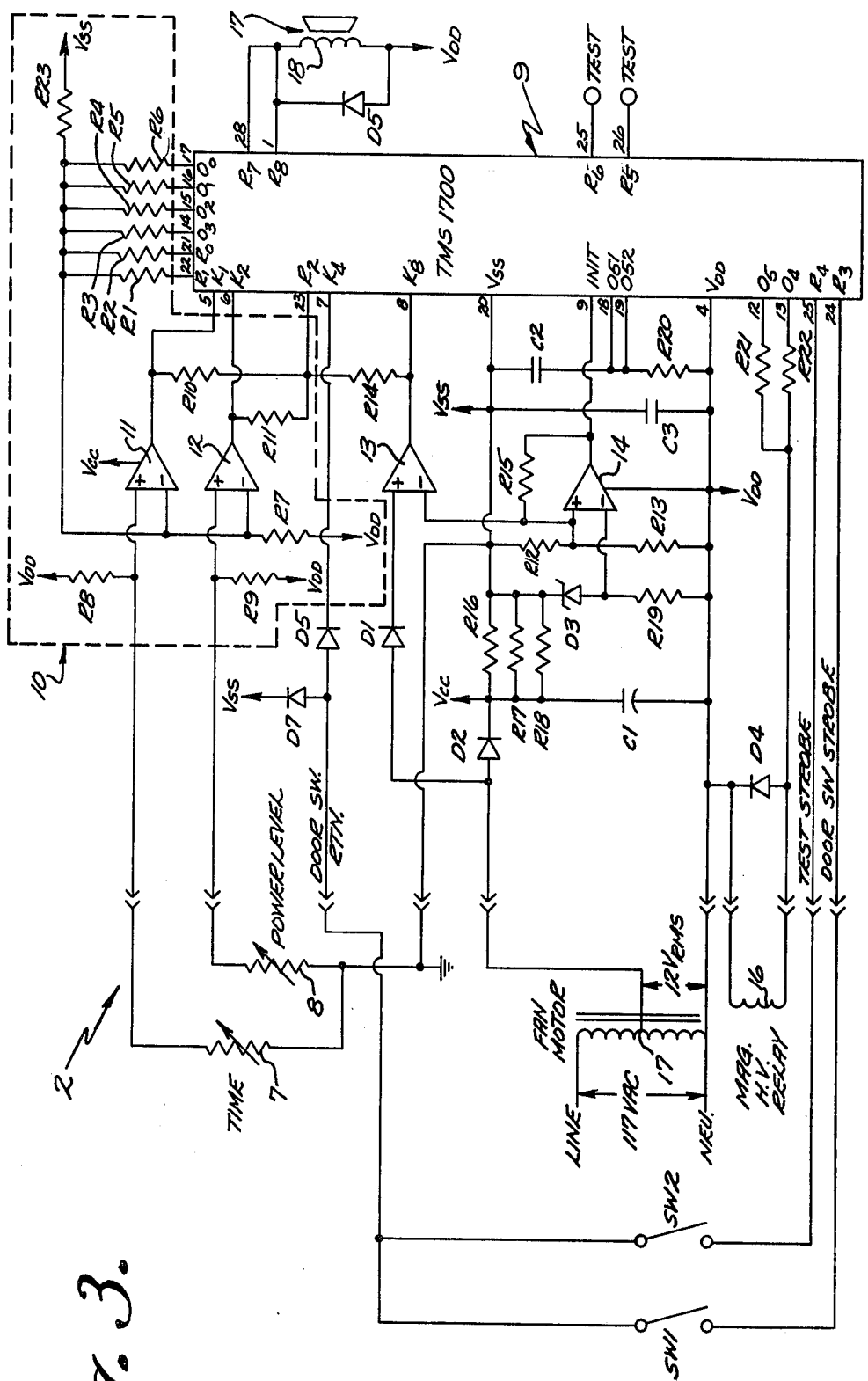
FIG. 3 is a schematic diagram of the controller of FIG. 1 having time and duty cycle input controls.

Dial 4 is connected to a potentiometer 7 seen in FIG. 3 while dial 5 is connected to a potentiometer 8. Potentiometers 7 and 8 are connected to a digital electronic microprocessor 9 through an analog to digital converter 19 explained below. Microprocessor 9 is a TMS 1700 having a 0.5K ROM manufactured by Texas Instruments Incorporated. Digital to analog converter 10 comprises a binary weighted resistive ladder with increasing powers of resistance to formulate a digital to analog representation including resistors R1–R6 respectively connected to $R_1$, $R_0$, $O_3$, $O_2$, $O_1$, and $O_0$ of processor 9. These resistors are connected in parallel to the minus input of comparators 11 and 12 and then to $V_{DD}$ through a resistor R7. The plus input of comparator 11 is connected to a voltage divider comprising potentiometer 7 and resistor R8 which in turn is connected to $V_{DD}$. The plus input of comparator 12 is connected to a voltage divider comprising potentiometer 8 and resistor R9 which is in turn connected to $V_{DD}$. The output of comparators 11 and 12 are connected respectively to ins $K_1$, $K_2$ of microprocessor 9. Pin $R_2$ of processor 9 is connected to the outputs of comparators 11 and 12 through 3.3K ohm resistors R10 and R11 respectively.

Comparators 11, 12 along with comparators 13 and 14 are provided by a type LM 2901 quad comparator. The positive input of Comparator 13 is used for a 60 Hertz input to K8 of processor 9 and is connected through diode D1 to a tap on a winding of the fan motor 15 used to cool the magnetron. The negative input of comparator 13 is connected to a voltage divider comprising a resistor R12 and resistor R13. The output of comparator 13 is connected to K8 of processor 9 and to R2 of the processor through a 3.3K ohm resistor R14.

Comparator 14 with its output connected to "Init" of processor 9 provides initialization of microprocessor 9 and has its positive input connected to the junction of resistor R12 and R13. A feedback resistor R15 is connected between the positive input of comparator 14 and its output. The tap of the fan motor winding 15 is connected through diode D2 and parallel connected resistors R16, R17, R18 to $V_{SS}$ of processor 9. Resistors R16–R18 are half watt 330 ohm resistors to dissipate power and avoid excess temperature at a localized portion of the circuit board. A zener diode D3 is connected between $V_{SS}$ of processor 9 and the negative input of comparator 14. A 10 ohm resistor R19 is placed between the negative input of comparator 14 and $V_{DD}$ pin of processor 9. Capacitor C1 is connected between $V_{DD}$ of processor 9 and the junction between the parallel connected resistor R16–R18 and diode D2. $O_{S1}$ and $O_{S2}$ of processor 9 are connected in parallel between capacitor C2 and resistor R20. The other side of capacitor C2 is connected to $V_{SS}$ of microprocessor 9 while the other side of resistor R R20 is connected to $V_{DD}$ of processor 9. Capacitor C3 is also connected between $V_{DD}$ and $V_{SS}$.

A magnetic high voltage relay 16 to provide isolation between the magnetron and controller 2 is connected between $V_{DD}$ and output pins $O_5$ and $O_4$ of processor 9 through parallel connected resistor R21, R22 with diode D4 connected across the relay.

An audio signal generator 17 comprising a coil 18 and diode D5 connected thereacross is connected between $V_{DD}$ and the $R_7$ and $R_8$ pins of processor 9. Pins $R_5$ and $R_6$ are provided for testing purposes. Pins $R_3$ and $R_4$ of the processor are connected respectively to the door switch strobe and the test strobe and are connected through respective switches SW1, SW2 to $K_4$ of processor 9 through diode D6 and to $V_{SS}$ through diode D7. Resistor R23 is connected between the resistive ladder R1-R6 and $V_{SS}$ of processor 9.

Potentiometers 7 and 8 will generate a voltage based upon the resistance value at the degree of rotation of respective knob 4 and 5 which is fed to the positive input of respective comparators 11 and 12. The microprocessor then generates a voltage at the negative input of the comparators by turning on each of the output lines $R_1$ and $O_0$ to select a binary weighted resistor by using a binary coded scheme, that is the voltage at the minus input will be incremented in steps defined by the value of each of resistors R1 to R6 completing the analog to digital conversion process. Processor 9 reads the output of respective comparators 11 and 12 respectively at the $K_1$ and $K_2$ inputs. The comparator output will be high or low depending upon whether the analog to digital converter 10 voltage is above or below the positive input voltage. That is, the microprocessor steps up through the binary weighted resistor ladder through a binary code until at some step it will see that it has crossed the plus input voltage of the comparator. After going through the binary output for the comparator 11 which provides the time data it then goes through the binary count again generating a voltage on the minus input of the comparator and reads $K_2$ at some binary count when comparator 12 switches and converts this into a particular power level.

In the FIG. 3 controller isolation is not required so the control can be powered conveniently by taking a tap from fan motor 15. Comparator 13 is used for a 60 Hertz input to input $K_8$ of processor 9 with diode $D_1$ providing isolation from the transformer. The minus input of comparator 13 has a voltage reference set up by voltage divider R12 and R13 which is also used to set up a threshold for initialization comparator 14 with resistor R15 providing suitable hystersis. As the controller is powered up, the voltage comes up and once it reaches the regulated point based on the current flowing through zener diode D3 comparator 14 switches on the initialization of processor 9 so that it goes into the defined algorithm routine. Thus the voltage provided by voltage divider R12, R13 is compared to the voltage regulated by diode D3 and resistor R19. Resistors R16–R18 merely provide power dissipation to distribute the power on the printed circuit board. Capacitor C1 is a large filter capacitor to filter the direct current generated by diode D2 from the transformer input. The oscillator of microprocessor 9 is provided by the resistor, capacitor network of C2, R20. $O_{S1}$ and $O_{S2}$ of processor 9 is connected to the junctions of resistor R20 and capacitor C2 which in turn are connected between $V_{SS}$ and $V_{DD}$ of the processor.

Processor 9 has two outputs, one provided by pins $R_7$ and $R_8$ which are connected to the audio device 17 which beeps to indicate the end of a cooking cycle. The other output is from pins $O_4$ and $O_5$ which drive the magnetron switching. Relay 16 is a conventional high voltage reed relay used to switch the secondary of the high voltage in the magnetron circuit (not shown). Thus relay 16 provides isolation between the low voltage of controller 3 and the high voltage of the magnetron circuit.

Pins $R_4$ and $R_3$ are the test strobe and door switch strobe respectively. They strobe through switches SW1, SW2 respectively back into $K_4$ of processor 9 to see if the door is closed or if the controller is in a test mode (the latter being used for manufacturing tests).

Figure 2:
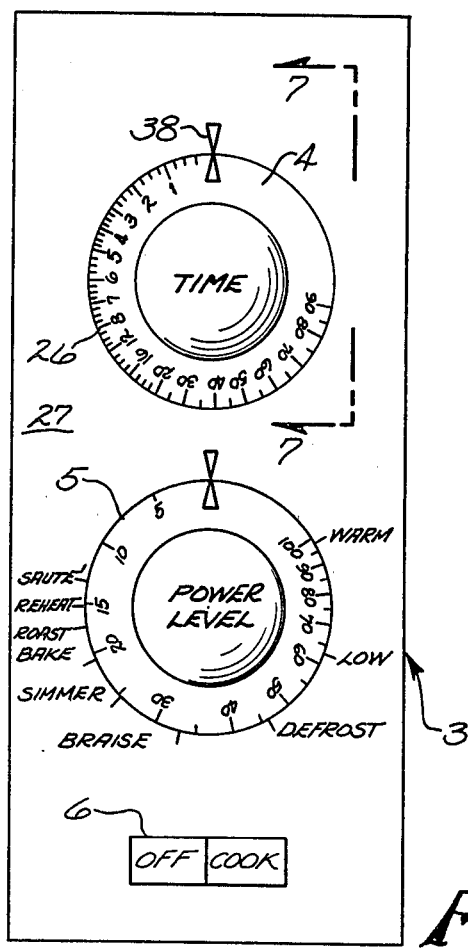
FIG. 2 is a front view of the data input panel for activating the controller of FIG. 1.
Figure 3A:
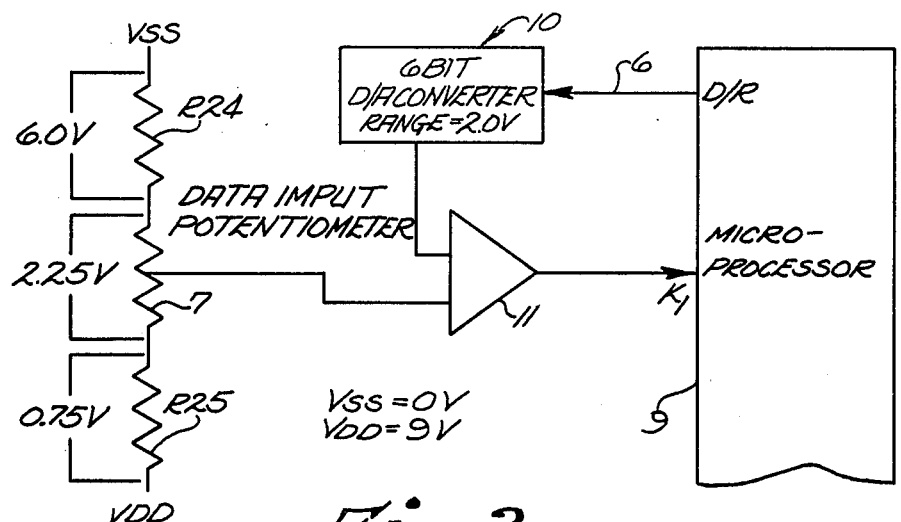
FIG. 3a is a schematic diagram of a linear input useful in the FIG. 3 controller.

Comparing the voltage drop across fixed resistors R8 and R9 through operation of the respective potentiometer 7 and 8 with the voltage generated by the digital to analog converter 10 provides a nonlinear input much like a common log scale, as depicted on the dials in FIG. 2. This type of input allows a large range of data to be input, however the data to be handled linearly requires a large number of steps of an analog to digital converter. Additionally, the accuracy of the converter is poor at the top end of the scale. FIG. 3a depicts a circuit arrangement overcoming these disadvantages by using a potentiometer as a linear input device providing good accuracy but limited to a smaller number of steps for a realistic rotation of the dial per step, for example, 5 rotational degrees. A large range of data input is handled with few converter steps by having the program of the microprocessor define different steps of the converter to be different values of data input. The six bit converter 10 is used to input time from zero to ninety minutes by using fifteen second increments from zero to eight minutes (thirty two steps), one minute increments from eight minutes to twenty minutes (twelve steps) and five minute increments from twenty minutes to ninety minutes (fourteen steps) for a total of fifty eight steps of the possible sixty-four steps of the converter. This procedure provides an appearance of a log scale on dial 4 but actually each of the segments is linear.

As seen in FIG. 3a digital to analog converter 10, shown schematically, is inputted to the negative input of comparator 11. Potentiometer 7 is serially connected between resistors R24 and R25 which are respectively connected to $V_{SS}$ of zero volts and $V_{DD}$ of nine volts. Resistor R24 is of 26.7K ohms, potentiometer 7 of 10K ohms and resistor R25 of 3.3K ohms so that there is a drop of 0.75 volts across R25 and 6.0 volts across R24.

Although the power level input dial 5 could also be operated linearly, it is not shown as such in FIG. 2.

The components used in controller 2 are as follows:

|     |           | 9 TMS 1700 |              |      |           |
|-----|-----------|------------|--------------|------|-----------|
|     |           | 11-14 LM 2901 |           |      |           |
|     |           | 7 100K potentiometer |    |      |           |
|     |           | 8 100K potentiometer |    |      |           |
| R1  | 8K ohms   | R11        | 3.3K ohms    | R21  | 390 ohms  |
| R2  | 16K ohms  | R12        | 100K ohms    | R22  | 390 ohms  |
| R3  | 33.2K ohms| R13        | 680 ohms     | R23  | 120K ohms |
| R4  | 68K ohms  | R14        | 3.3K ohms    |      |           |
| R5  | 143K ohms | R15        | 910K ohms    |      |           |
| R6  | 280K ohms | R16        | 330 ohms ½ watt | D1 IN914 | C1 470 μf |
| R7  | 1.6K ohms | R17        | 330 ohms ½ watt | D2 IN4004 | C2 100 pf |
| R8  | 1K ohms   | R18        | 330 ohms ½ watt | D3 IN4738A | C3 .1 μf |
| R9  | 1K ohms   | R19        | 10 ohms      | D4 IN914 |           |
| R10 | 3.3K ohms | R20        | 24K ohms     | D5 IN914 |           |
|     |           |            |              | D6 IN914 |           |
|     |           |            |              | D7 IN914 |           |

Based on the disclosure given to this point, it is believed that a programmer of ordinary skill in the art could implement the various operating cycles commonly found in microwave ovens. Nonetheless, to insure that a complete disclosure of the invention is given, there follows a detailed description of the logic diagram relating to each program routine necessary to implement an operative device.

With reference to FIGS. 14-19 a logic diagram generally depicts in conjunction with FIG. 3, the operation of controller 2. In the following description of the figures the data used is hexadecimal. The X register is used to address the "O" output lines as defined by the "O" output programmable logic array (OPLA) set forth below. The OPLA is mask programmed in the microprocessor. As used in the description, "set" means to turn on an output device or transfer prescribed data to an identified register, file or flag; "reset" means to turn off an output, device, or an identified register, file or flag; "flag" refers to a status bit or a location set up in RAM; "K" indicates a microprocessor input line corresponding to the digit following the K; and "read" means to transfer the status of the K inputs to accumulator, register, or RAM. Timing for debouncing and audio annunciating, indicating end of cycle and other functions are generated from the clock oscillator of microprocessor 9. In the described embodiment, oscillator clock frequency of microprocessor 9 is 250 Kilo hertz with one instruction cycle being equal to six clock cycles or twenty-four microseconds. Thus timing for these functions is obtained by counting the number of times a loop is passed through. Other timing such as cook time is based upon the sixty Hertz frequency of the power supply.

Figure 14:
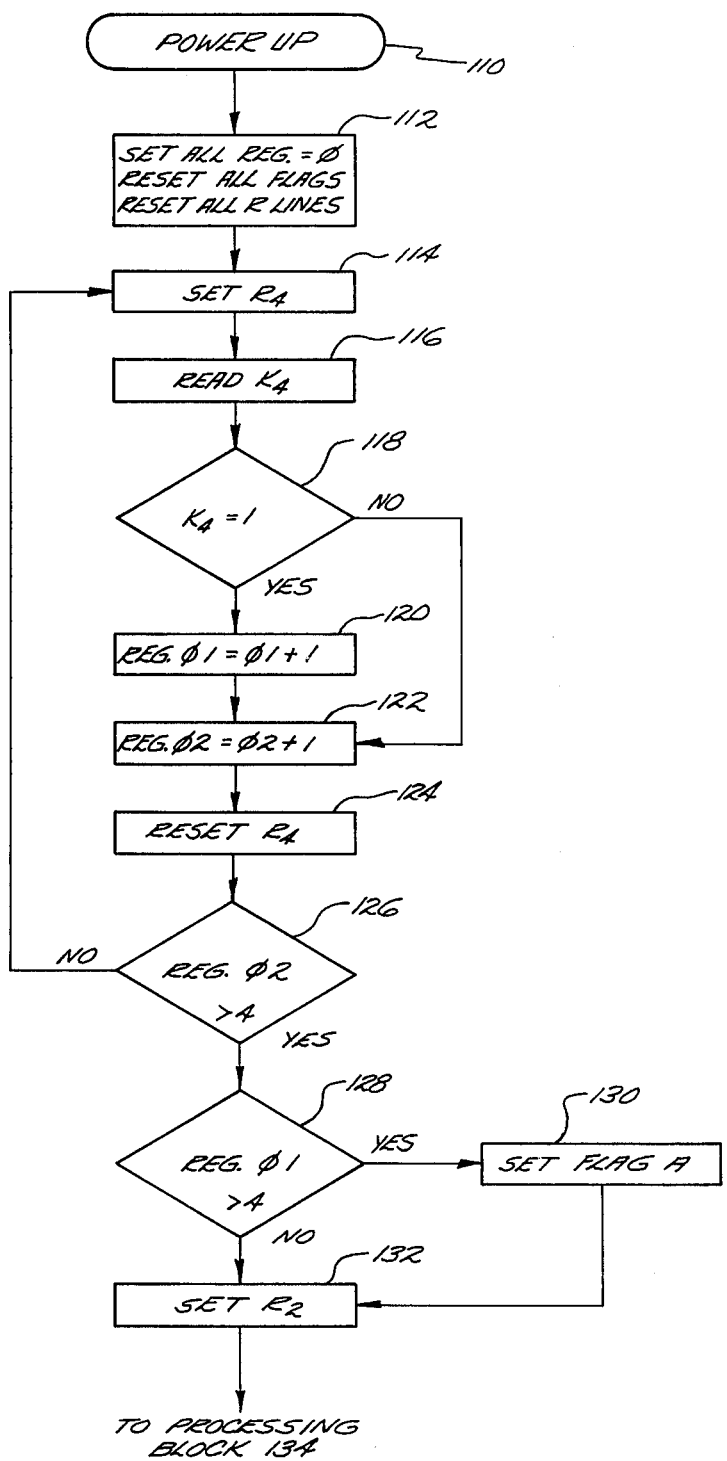
FIGS. 14–19 show a logic diagram generally depicting the operation of controller 2 in conjunction with FIG. 3.

As seen in FIG. 14, at 110 the control is powered up with all the registers being cleared, all the flags set and all the R lines reset at processing block 112. The first portion of the logic of the operation of controller 2, as depicted in FIG. 14, is involved with reading and debouncing the test switch. That is, switch SW-2 must be in a stable state, either opened or closed, for five cycles. Line $R_4$ is set at processing block 114 to enable the test switch. The status of the test switch is read on input $K_4$ at processing block 116. Input $K_4$ is then tested at decision block 118. If switch SW-2 is closed input $K_4$ is high and register ∅1 is incremented at processing block 120 and a loop is generated to debounce the switch going through the loop five times. If switch SW-2 is opened, input $K_4$ is low and register ∅2 is incremented at block 122 staying in the loop indicating an opened switch. Line $R_4$ is reset at processing block 124 and then at decision block 126 if register ∅2 is greater than 4 and if register ∅1 is greater than 4 at decision block 128 flag A is set at processing block 130 indicating that the control is in the test mode. If register ∅1 is less than or equal to 4, the control is in the cook mode and everything is ready to start into the operation of the oven by setting line $R_2$ at processing block 132 enabling comparator inputs $K_1$, $K_2$, and $K_8$.

Figure 15:
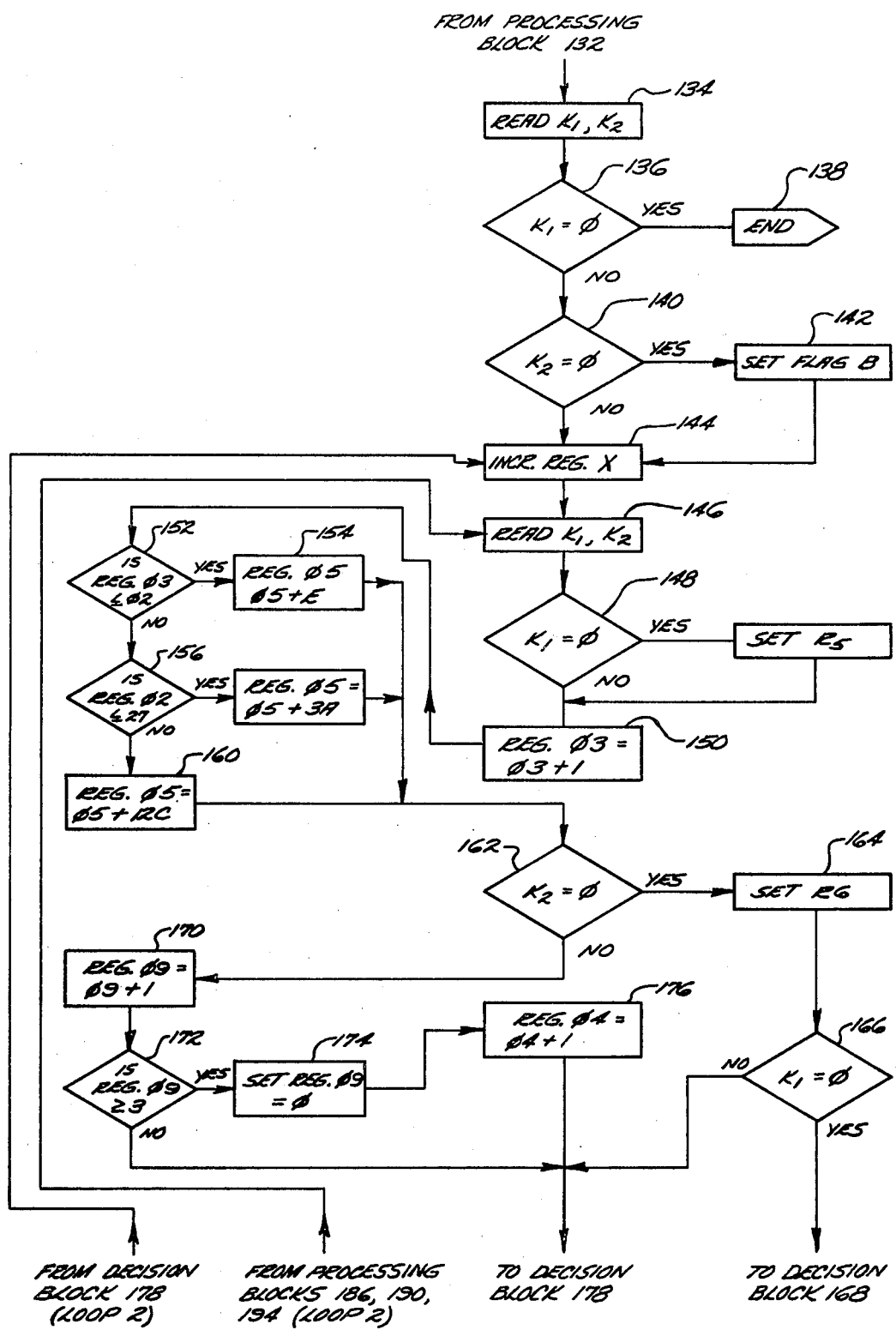

As seen in FIG. 15, at processing block 134, inputs $K_1$ and $K_2$ from comparators 11 and 13 relating to the time potentiometer 7 and power level potentiometer 8 respectively are read. If input $K_1$ is low at decision block 136, that indicates that time has not been entered and the control goes to the end of the cycle, 138. If input $K_1$ is high, then the status of the power level potentiometer is checked at decision block 140. If input $K_2$ is low, then flag B, is set at processing block 142 and the control is operated in a minute timer mode. That is, the magnetron will not be turned on but the control will generate cook time to enable using the control as a timer.

Figure 16:
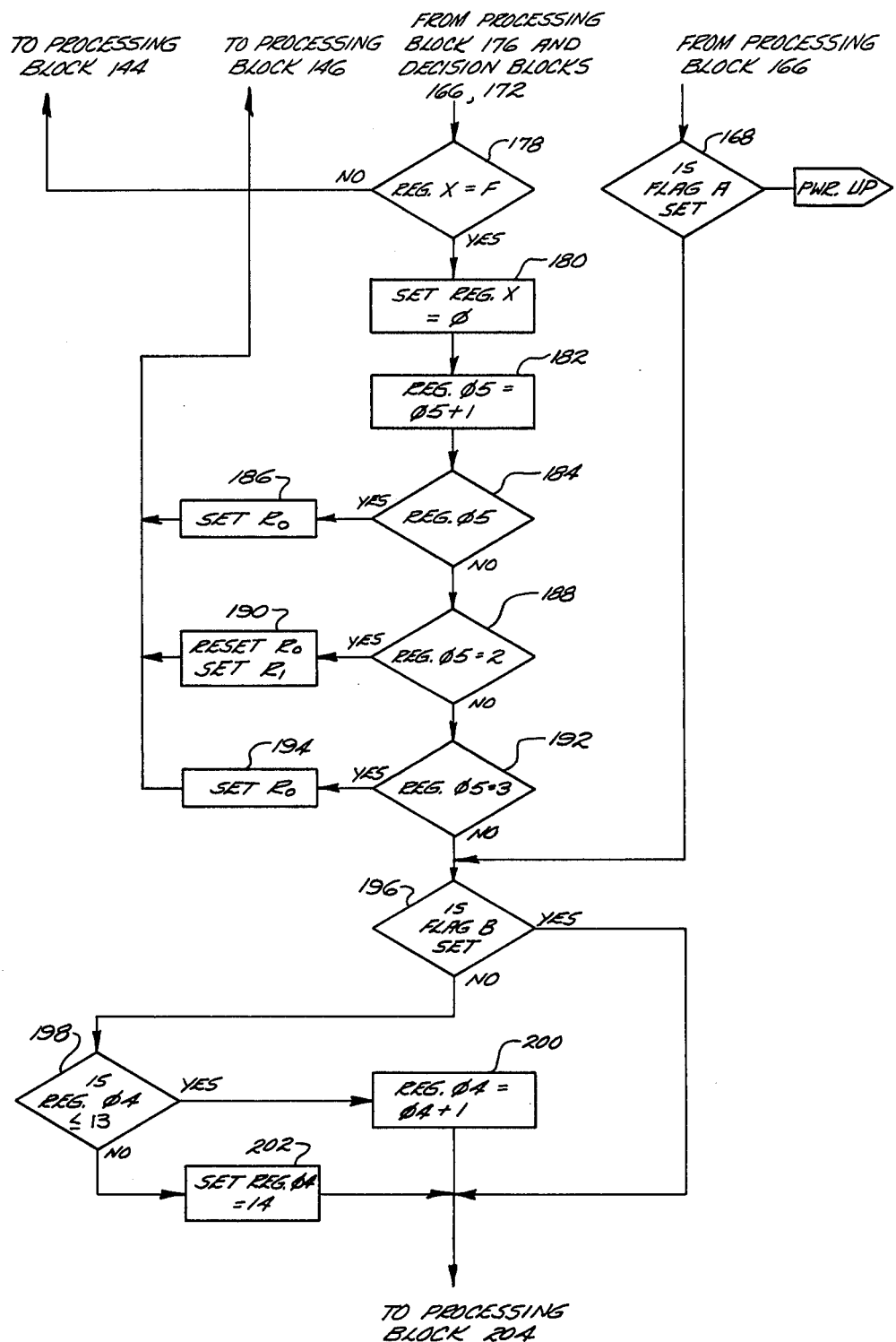

The next portion of the logic depicted in FIGS. 15 and 16 deal primarily with the outputting to the digital to analog converter and reading inputs through the comparators from the analog to digital converter, reading the potentiometers and storing that information to be used later in the cook program. This is also a test mode if flag A is set in which known resistances are substituted for the potentiometers to obtain a binary output from $O_0, O_1, O_2, O_3, R_0, R_1$ (FIG. 3) which is compared to a known binary equivalent of the resistor value substituted. When the binary sequence matches the input which is detected by the switching of the comparator at the K input can be read by determining which binary output lines are high. This is determined by using lines $R_5$ and $R_6$. When comparator 11 (FIG. 3) switches from a high to a low state, line $R_5$ is turned on indicating that time is available on the binary outputs so test equipment can read that information. In like manner line $R_6$ is used to tell when power level information is available on the binary outputs.

Register X is incremented at processing block 144 increasing the binary weighting of the digital to analog converter ($O_0$ and through $O_3$) by one step. The state of comparators 11 and 13 through input $K_1, K_2$ is read at processing block 146. At decision block 148 if input $K_1$, is low, then line $R_5$ is set notifying test equipment that time input is available at the output lines $O_0, O_1, O_2, O_3$, $R_0$, and $R_1$ in binary form. Register $\emptyset 3$ used to generate the cook cycle is then incremented at processing block 150.

The digital to analog binary output is decoded for cook time entry with the first 32 steps ($\leq 100000$) equal to fifteen seconds per step the next seven steps ($\leq 100111$) equal to one minute per step and the last twenty steps ($>100111$) equal to five minutes per step.

At decision block 152 if register $\emptyset 3$ is equal to or less than 20, decimal fifteen seconds is added to cook time (processing block 154). If register $\emptyset 3$ is greater than 20, then decision block 156 queries whether register $\emptyset 3$ is equal to or is less than 27, if so, decimal sixty seconds (one minute) is added to cook time (processing block 158). If register $\emptyset 3$ is greater than 27, then decimal three hundred seconds (five minutes) is added to cook time (processing block 160).

Each time through the loop the comparator is checked to see if it has switched. Initially register $\emptyset 3$ is checked to see if it is greater than hex 20 (binary 32). If it is less than or equal to hex 20, then decimal 15 seconds (hex E) is added to the cook time register $\emptyset 5$. By adding the different quantities to the time register in terms of seconds, a time has been generated corresponding to the number of times the loop is gone through.

At decision block 162 if input $K_2$ from the power level comparator 12 is low, then line $R_6$ is set (processing block 164). This enables the test equipment to read the power level data at output $O_0, O_1, O_2, O_3, R_0$, and $R_1$.

A period of twenty seconds was chosen for the duty cycle. This is divided into five percent increments as shown on the power level dial 5 shown in FIG. 2. Thus each five percent increment of on time is equal to one second.

The binary loop of the digital to analog output is a total of sixty four steps. If the last four are truncated, each increment added to the power level register will equal three steps (sixty divided by twenty).

If input $K_2$ is high at decision block 162, then register $\emptyset 9$ is incremented (processing block 170). Decision block 172 then asks whether register $\Phi 9$ is equal to or greater than 3, if so, register $\emptyset 9$ is set equal to zero (processing block 174) and register $\emptyset 4$ is incremented which occurs each three times through the loop.

Referring back to processing block 164 where line $R_6$ is set input $K_1$ is checked at decision block 166 to determine if the time input has been read. If input $K_1$ is low, then the time comparator 11 has switched and test flag A is checked at decision block 168 to determine if the control is in the test mode. If flag A has been set, then it cycles back to read another input (either time or power level) and continues in this fashion until the test switch is opened. If flag A has not been set, then the sequence goes into the cook routine as will be explained below.

At decision block 178 resister X is checked to see if the digital to analog outputs ($O_0, O_1, O_2, O_3$) have reached a full count. If not, incrementing of register X (processing block 144) is continued. If a full count has been reached, register X is set to zero (processing block 180) turning off all O output lines. Now register $\emptyset 5$ is incremented to determine the number of times the register X incrementing loop has been gone through (processing block 182). The register X incrementing loop is incremented a total of sixteen times incrementing a time register and a power level register until the comparator switches. Once the comparator switches, the registers will be bypassed each time. Thus, decision block 184 is queried and if register $\emptyset 5$ is equal to one, register X is not incremented and line $R_0$ is turned on (processing block 186) to set digital to analog outputs to binary 010000. If register $\emptyset 5$ is not equal to one, then decision block 188 is queried to see if it equals 2, if so, line $R_0$ is reset and $R_1$ is set with the digital to analog outputs set to binary 100000 (processing block 190). If register $\emptyset 5$ does not equal 2, decision block 192 is queried to see if it equals 3, if so, line $R_0$ is set with digital to analog output set to binary 110000 (processing block 194). If register $\emptyset 5$ is not equal to three, then decision block 196 is queried to see if flag B is set. If so, as stated above, this indicates that the power level was not set so that the control would function as a minute timer. Therefore if flag B is set, register $\emptyset 4$ is bypassed.

If flag B is not set, then decision block 198 is queried to see if register $\emptyset 4$ is equal to or less than 13, i.e., is the power level register equal to or less than decimal 19. That is, the available sixty-four steps divided by three for three times through the loop equals 21 and a maximum of twenty is allowed in power level register $\emptyset 4$. If register $\emptyset 4$ is less than or equal to 13, then register $\emptyset 4$ is incremented (processing block 200) since the set of $R_6$ loop (processing block 164) bypasses the last increment through loops 2 or 3. If register $\emptyset 4$ is more than 13, register $\emptyset 4$ is set equal to 14 (processing block 202). Thus if the power level is equal to or greater than twenty, it is set to twenty, or 100% duty cycle.

Figure 17:
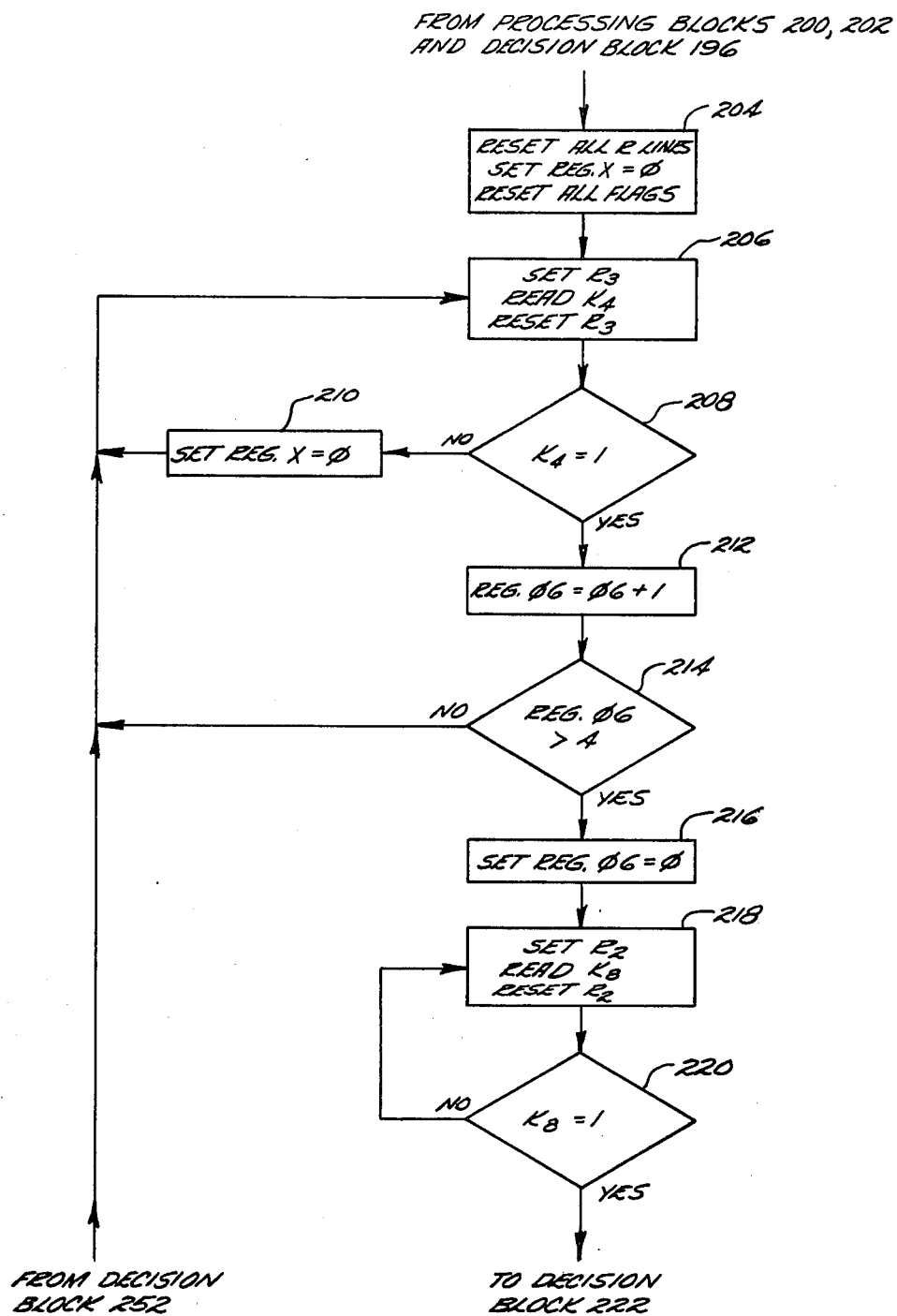
Figure 18:
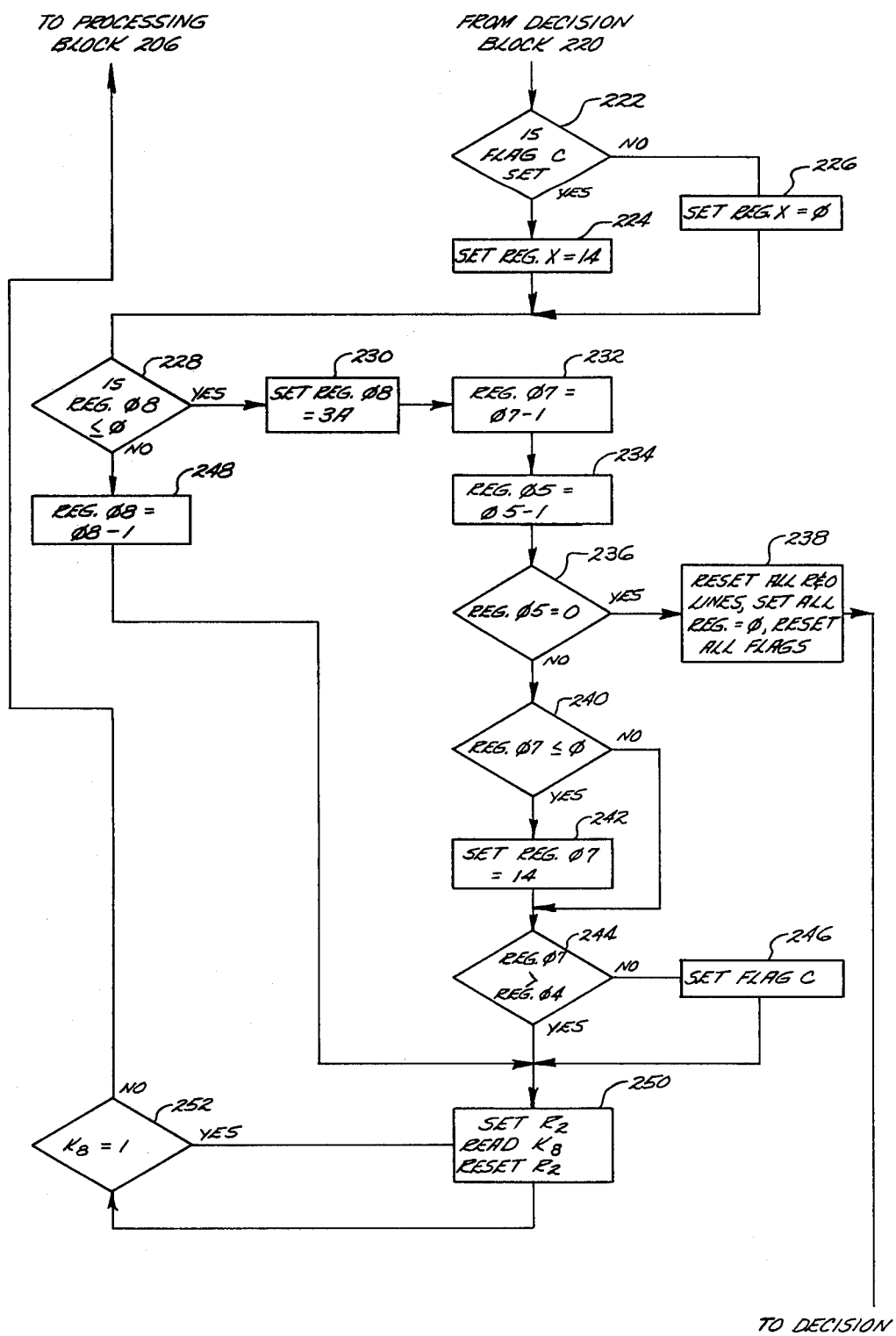
Figure 19:
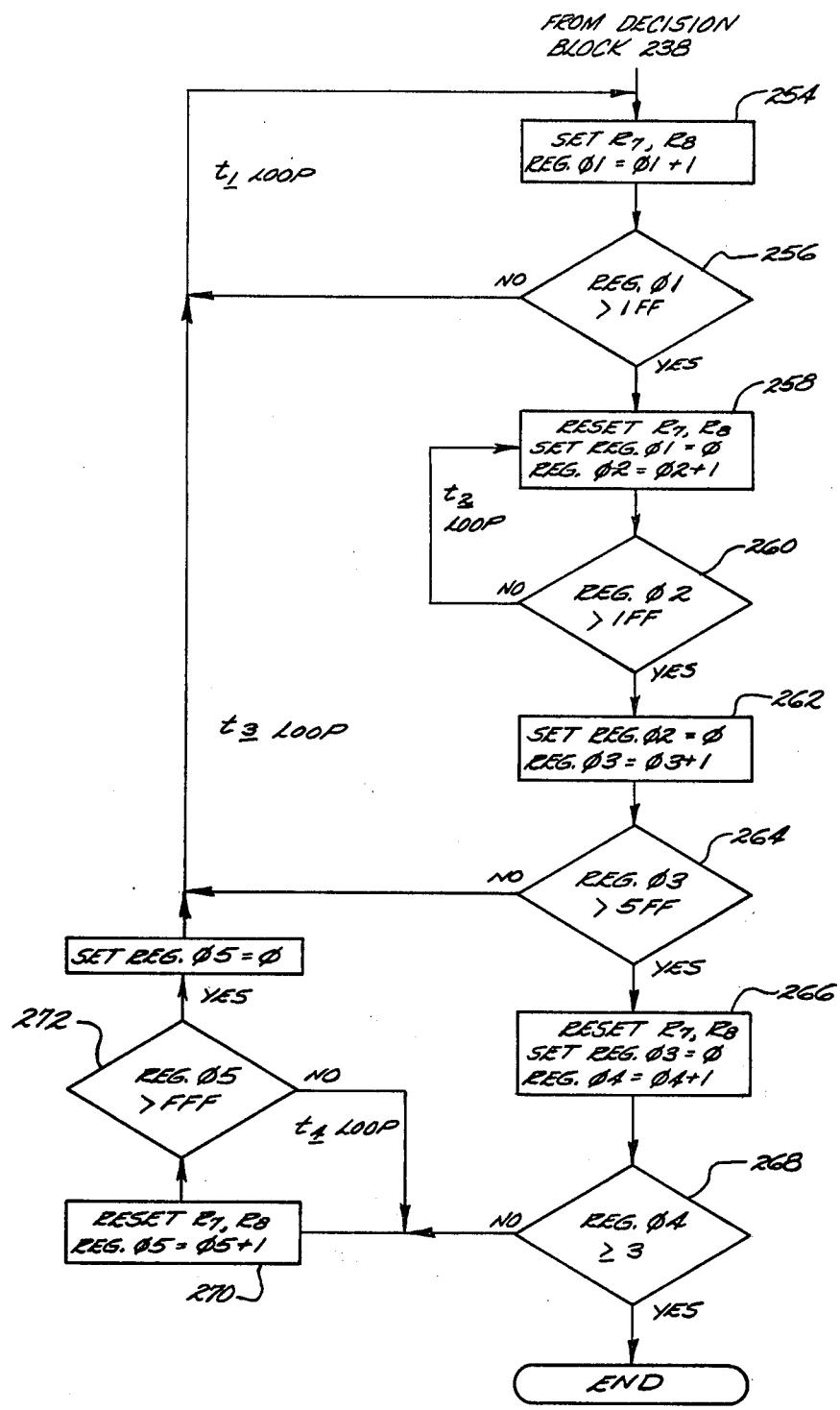

With reference to FIG. 17, at processing block 204 all R lines, are reset, register X is set equal to zero and all flags are reset. The time and power level inputs have been read and can no longer be changed without powering down. At this point the cook cycle is started.

The first step is to check the door switch which is done by setting line $R_3$ (processing block 206), reading input $K_4$ and resetting line $R_3$. If input $K_4$ is low (decision block 208), meaning the door switch is opened, then register X is set to zero (processing block 210) with the magnetron output turned off and with monitoring of the door switch continued.

If input $K_4$ is high, indicating that the door switch is closed, then register $\emptyset 6$, a debouncer counter, is incremented (processing block 212). The debouncing requires that the door switch be closed for five cycles through the loop. Thus decision block 214 is queried to see if register ∅6 is greater than 4 to see if the debouncing sequence has been concluded. If it has, register ∅6 is reset (processing block 216) and then at processing block 218 line $R_2$ is set and input $K_8$ is read. That is, the sixty hertz input from comparator 13 is monitored for low to high transition, 0° phase angle, of the sine wave and provides timing of sixty cycles per second through the main program loop. Decision block 220 checks the state of input $K_8$ and if high decision block 222 queries whether flag C, the power level control flag to be discussed below, has been set. If it has been set, this calls for the magnetron to be on and register X is set equal to 14 (processing block 224) which is defined in the OPLA as $O_4$ and $O_5$ lines being on which drive the magnetron high voltage relay 17. If the flag is not set, then the relay remains off (turning output lines $O_4$, $O_5$ off) and register X is set equal to zero (processing block 226).

At this point the sixty hertz input cycles are converted to one second increments by means of register ∅8 which is decremented each time through the loop. Thus, decision block 228 queries whether register ∅8 is equal to zero to determine if one second has expired, if it has, register ∅8 is set equal to 3A (decimal 60 for 60 cycles per second processing block 230) and register ∅7, a twenty second counter for power level control, is decremented by one second (processing block 232). Register ∅5, the cook time register, is then decremented by one second (processing block 234). Decision block 236 then queries if the cook time has expired by determining whether register ∅5 equals zero. If so, all the R and O lines are reset, all the registers are set to zero and all the flags are reset (processing block 238). This represents the end of the cook cycle and is preparatory to the audio output routine to be discussed below. If cook time has not expired, then decision block 240 queries whether register ∅7 is equal to zero to determine whether this is the first time through the loop or has the ten's counter decremented to zero. If register ∅7 equals zero, then it is set to 14, that is the twenty second counter is set to decimal 20 (processing block 242). Now register ∅7 is compared to register ∅4 (decision block 244). If register ∅7 is greater than register ∅4, the magnetron will not be turned on and register ∅7 will be decremented every one second and compared to register ∅4. When it equals register ∅4, the magnetron will be turned on and will remain on until it decrements to zero and is again reset to twenty. When register ∅7 is less than register ∅4, flag C, which calls for the magnetron to be on, is set (processing block 246).

Going back to decision block 228, if register ∅8, the sixty hertz counter, does not equal zero then it is decremented by decimal one of sixty (counts) (processing block 248) and comes down to processing block 250 which is also connected to decision block 244 and processing block 246. At this point line $R_2$ is set and input $K_8$ is read and line $R_2$ reset to monitor the sixty hertz input for high to low transition. Decision block 252 queries whether input $K_8$ is high and if so, it goes all the way back to processing block 206 to read the door switch every sixty hertz cycle to see if the door switch opened or closed.

When the cook time expires (decision block 236), the end of cycle audio annunciator 17 is activated to generate an audio tone of two kilohertz for a half second on and a half second off for three cycles. The audio transducer is turned on for time $t_1$ by setting lines $R_7$, $R_8$ (incrementing register 01-processing block 254). Decision block 256 determines when $t_1$ has expired. When $t_1$ has expired, the transducer is turned off for time $t_2$ (processing block 258) with lines $R_7$, $R_8$ reset, register ∅1 set to zero and register ∅2 incremented. Decision block 260 determines when $t_2$ has expired after which the transducer is enabled for time $t_3$ (processing block 262 with register ∅2 set to zero and register ∅3 incremented). Decision block 264 determines when $t_3$ expired after which the transducer is disabled for $t_4$ (processing block 266) with lines $R_7$, $R_8$ reset, register ∅3 set to zero and register ∅4 incremented. Decision block 268 determines when three half second cycles has been completed. If it has not been completed, processing block 270 resets line $R_7$, $R_8$, and increments register ∅5. Decision block 272 determines when time $t_4$ has expired and after which it sets register ∅5 to zero. When three half second cycles have been completed, the entire routine is ended.

The OPLA is set forth below:

| X REGISTER (HEX) | "O" OUTPUT LINES | | | | | | | |
|---|---|---|---|---|---|---|---|---|
| | $O_7$ | $O_6$ | $O_5$ | $O_4$ | $O_3$ | $O_2$ | $O_1$ | $O_0$ |
| ∅ ∅ | $O_6$ and $O_7$ | | ∅ | ∅ | ∅ | ∅ | ∅ | ∅ |
| ∅ 1 | Not used | | ∅ | ∅ | ∅ | ∅ | ∅ | 1 |
| ∅ 2 | | | ∅ | ∅ | ∅ | ∅ | 1 | ∅ |
| ∅ 3 | | | ∅ | ∅ | ∅ | ∅ | 1 | 1 |
| ∅ 4 | | | ∅ | ∅ | ∅ | 1 | ∅ | ∅ |
| ∅ 5 | | | ∅ | ∅ | ∅ | 1 | ∅ | 1 |
| ∅ 6 | | | ∅ | ∅ | ∅ | 1 | 1 | ∅ |
| ∅ 7 | | | ∅ | ∅ | ∅ | 1 | 1 | 1 |
| ∅ 8 | | | ∅ | ∅ | 1 | ∅ | ∅ | ∅ |
| ∅ 9 | | | ∅ | ∅ | 1 | ∅ | ∅ | 1 |
| ∅ A | | | ∅ | ∅ | 1 | ∅ | 1 | ∅ |
| ∅ B | | | ∅ | ∅ | 1 | ∅ | 1 | 1 |
| ∅ C | | | ∅ | ∅ | 1 | 1 | ∅ | ∅ |
| ∅ D | | | ∅ | ∅ | 1 | 1 | ∅ | 1 |
| ∅ E | | | ∅ | ∅ | 1 | 1 | 1 | ∅ |
| ∅ F | | | ∅ | ∅ | 1 | 1 | 1 | 1 |
| 1 ∅ | | | ∅ | ∅ | ∅ | ∅ | ∅ | ∅ |
| 1 1 | | | ∅ | ∅ | ∅ | ∅ | ∅ | ∅ |
| 1 2 | | | ∅ | ∅ | ∅ | ∅ | ∅ | ∅ |
| 1 3 | | | ∅ | ∅ | ∅ | ∅ | ∅ | ∅ |
| 1 4 | | | 1 | 1 | ∅ | ∅ | ∅ | ∅ |
| 1 5 | | | ∅ | ∅ | ∅ | ∅ | ∅ | ∅ |
| to F ∅ Not used | | | | | | | | |

Figure 4:
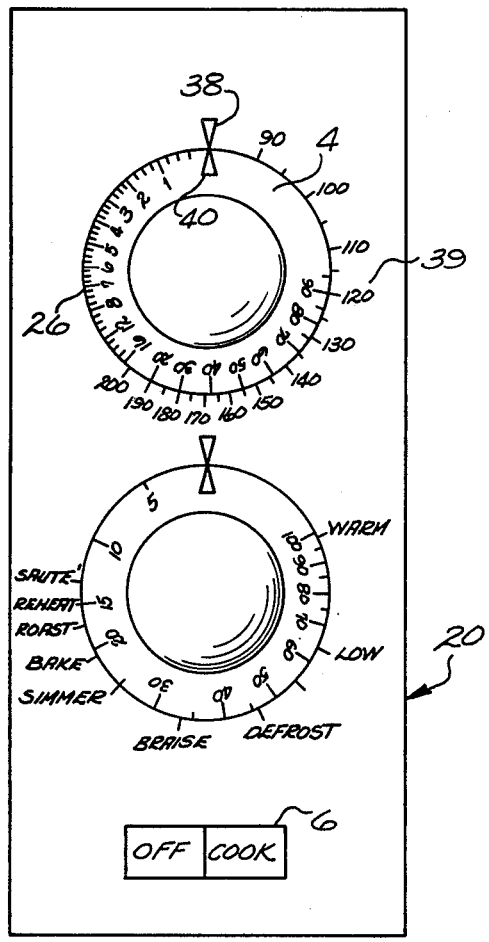
FIG. 4 is a front view of the data input panel used with an alternative controller.
Figure 5:
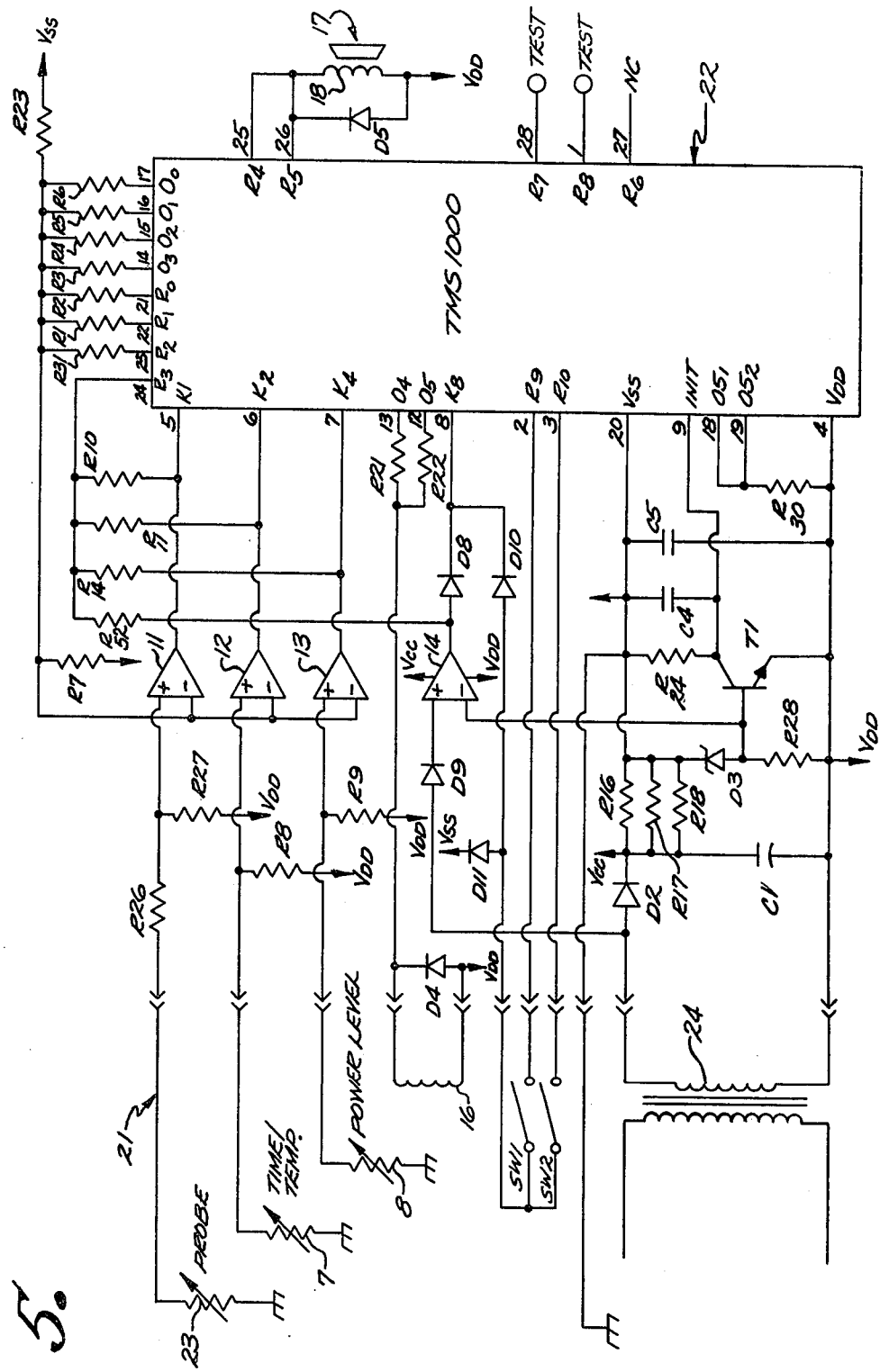
FIG. 5 is a schematic diagram of an embodiment similar to the FIG. 3 controller but adding temperature input control and using the input panel of FIG. 4.

FIG. 4 shows a data input panel 20 of a controller 21 shown in FIG. 5 which is similar to the FIG. 3 controller but has an added temperature input capability. Controller 21 employs microprocessor 22 which is a TMS 1000 having 1K ROM, manufactured by Texas Instruments Incorporated.

As in the FIG. 3 embodiment, the quad comparator comprising comparators 11-14 are used in controller 21 but in a slightly different manner. Comparator 11 still has its output connected to $K_1$ (pin 5) of processor 22 and its negative input connected to the voltage divider formed by analog to digital converter 10 with register R7. However, the positive input of comaprator 11 is connected to a voltage divider comprising resistors R26 and R27. Resistor R26 is series connectable to a temperature probe which comprises a conventional temperature dependent resistor having a negative temperature coefficient (NTC) of resistivity.

The output of comparators 12 and 13 are connected respectively to $K_2$ (pin 6) and $K_4$ (pin 7) of processor 22 and each has its negative input connected to the voltage divider comprising converter 10 and resistor R7. The positive input of comparator 12 is connected to the voltage divider of potentiometer 7 and fixed resistor R8 while the positive input of comparator 13 is connected to the voltage divider comprising potentiometer 8 and fixed resistor R9.

Comparator 14 has its output connected to $K_8$ (pin 8) of processor 22 through a diode D8. The positive input of comparator 14 is connected to transformer winding 24 through diode D9. The negative input of comparator 14 is connected to the base of NPN transistor T1 which in turn is connected to a voltage divider comprising resistor R28 and parallel connected resistors R16-R18 with the voltage divider and capacitor C1 connected across winding 24. Zener Diode D3 is connected between the base of transistor T1 and resistors R16-R18. Diode D2 is also connected to winding 24 to rectify the AC current. The emitter of transistor T1 is hooked to $V_{DD}$ (pin 4) of processor 22 while its collector is connected though resistor R29 to $V_{SS}$ (pin 20) and to the initilization input, pin 9 of the processor. Capacitor C4 is also connected between the collector and $V_{SS}$ while capacitor C5 is connected between $V_{SS}$ and $V_{DD}$ of the processor. Pin 18 and 19 ($O_{S1}$ and $O_{S2}$ of the processor) are connected through resistor R30 to $V_{DD}$.

Resistors R10, R11, R14, and R52 are connected between $R_3$ (pin 24) of processor 22 and respective outputs of comparators 11-14. Resistors R21 connected to $O_4$ (pin 13) and R22 connected to $O_5$ (pin 12) of processor 22 are connected to magnetic high voltage relay 16 to provide power to the magnetron circuit of the oven. Door switch SW1, connected though a prong and jack to R9 (pin 2), and test switch SW2 connected to R10 (pin 3) are connected to $K_8$ (pin 8) through diode D10 and to $V_{SS}$ through diode D11. $R_7$ (pin 28) and $R_8$ (pin 1) of the processor are used for testing of the system while $R_6$ (pin 27) is not used. As in the FIG. 3 embodiment, a second output in the form of an audio circuit 17 is provided with coil 18 and diode D5 connected thereacross powered by commonly connected outputs $R_4$ (pin 25) and $R_5$ (pin 26). The binary weighted resistors R1-R6 of converter 10 are connected respectively to R1 (pin 22), $R_0$ (pin 21), $O_3$ (pin 14), $O_2$ (pin 15), $O_1$ (pin 16), and $O_0$ (pin 17). Resistor R31 is also connected in parallel with resistors R1-R6 and is connected to $R_3$ (pin 24) of processor 22.

The controller of FIG. 5 adds the feature of reading temperature set point data and reading the actual food temperature. It will be noted that there is no limit to the number of analog to digital converters that may be controlled by the single digital to analog converter 10. In controller 22 the temperature probe 23 is used to determine which of two types of data is inputted by the one potentiometer dial 7 thereby providing dual function to two of the analog to digital converters. If probe 23 is not plugged in through the prong and jack arrangement controller 22 will read the data input by potentiometer dial 7 as cook time information. If the probe is plugged in, the control will read dial 7 as set point temperature data input.

Resistor R31 is added to the analog to digital converter 10 as a constant level shifter for the purpose of setting two temperature ranges for probe 23. When output $R_2$ controlling R31 is off (low), a temperature range of 0° to 90° F. is selected. When output $R_2$ is on (high), a temperature range of 90° F. to 200° F. is selected. It will be understood that the particular number of resistors employed for the converter circuits is chosen to provide selected resolution for the type of inputs desired. In fact, the resolution is limited only by the practical number of microprocessor lines available for a given microprocessor.

In this embodiment a transistor circuit is employed for initialization since the quad comparators are already used. As the voltage comes up when the controller is energized, current will start flowing in zener diode D3 after it breaks down and in the base circuit thereby turning transistor T1 on which bypasses resistor R28. Current flowing through transistor T1 returns to the $V_{DD}$ line. Turning on of transistor T1 pulls the initilization pin (pin 9) low thereby initializing the processor. The TMS 1000 microprocessor can be run either with or without a capacitor in the oscillator input. In FIG. 5 the internal capacitor has been relied on to provide the desired frequency in conjunction with resistor R30. It will be noted that controller 22 is powered through transformer 24 since isolation from high voltage is required due to the use of temperature probe 23.

In controller 22 the switch inputs from SW1 and SW2 have been multiplexed onto $K_8$ (pin 8). As is well-known, any number of inputs can be multiplexed onto a K input line as long as they are enabled individually using R outputs. Then when R9 is enabled and $R_3$ and $R_{10}$ are disabled, a high read $K_8$ indicates that the door is closed. If $R_{10}$ is enabled with $R_8$ and $R_3$ disabled and a high is read on $K_8$, it indicates that the test switch is closed. When $R_9$ and $R_{10}$ are disabled and $R_3$ enabled and a high is read on $K_8$, then that indicates 60 Hertz is high (the square wave outputting from the comparator).

The analog to digital probe circuit not only converts the probe input to temperature, it also detects the presence or absence of the probe. By determining whether or not the probe is present, it is converted to a time mode or temperature mode. A voltage divider is provided such that when all the outputs are turned off, a voltage divider exists between R23 tied to $V_{SS}$ and R7 tied to $V_{DD}$ on the minus input of the comparators 11-13. If the probe is not present infinite resistance results in a more negative input on the plus input than exists at the minus input therefore the comparator output is low.

When probe 23 is inserted a selected resistance value is seen, for example 250K to 500K ohms depending on the temperature, generating an increased voltage on the positive input. When that voltage goes above the minus input, the output of the comparator switches high before the converter 10 resistors R1-R6 are turned on indicating that the probe is present and conversion to the temperature mode is effected so that any input seen on $K_2$ is now a temperature input rather than a time input. Thus two different control functions are combined by means of resistor R23. These additional control requirements result in the need for a microprocessor with larger memory. In this embodiment the TMS 1000 microprocessor with 1K ROM is employed.

Utilizing resistor R23 in the described manner results in avoiding the expense associated with using a switch which is typically employed with temperature probes as well as certain capacity of the microprocessor which otherwise would be required to read whether the switch were closed or open. Additionally the fewer logic lines used, particularly relatively long ones, the less noise will be picked up and brought to the microprocessor and the smaller the possibilities of short circuits.

As noted above, resistor R31 is used to provide a level shift. That is, the operating range of particular interest is from approximately 90° to 200° F. however converter 10 must cover from 0° to 200° F. therefore when the probe is inserted, it is desirable to shift the converter to a different operating range to read actual temperature accurately in the 90°–200° F. range. Thus the converter is shifted by having more voltage generated across the adder resistor R7 which is additive to the voltage developed by each of resistors R1–R6 that is switched into the converter under the control of processor 22.

Both the TMS 1700 and the TMS 1000 microprocessors of controllers 2 and 22 have the same ratings. That is, the "0" lines have the driving capability of 24 milliamps for each line, so by paralleling two lines nearly 50 milliamps can be obtained as in the relay circuit 16, where two "R" lines are paralleled in the audio circuit 17. These "R" lines are rated at 12 milliamps average so the circuit can be driven directly off the output lines of the processor.

The components used in controller 22 are as follows:

| | | | | |
|---|---|---|---|---|
| 22 TMS 1000 | | | TI TIS92 | |
| 11–14 LM 2901 | | | | |
| 23 NTC temperature probe with characteristic | | | | |
| $R_O(T_1) = R_O(T_R)e^B(\frac{1}{T_1} - \frac{1}{T_R})$ | | | | |
| Where $T = O_K$ | | | | |
| $B = 3950°$ K. | | | | |
| $R = 50K$ ohms | | | | |
| $T_R = 25°$ C. | | | | |
| 7 100K potentiometer | | | | |
| 8 100K potentiometer | | | | |
| R1 | 15K ohms | R16 | 330 ohms ½ W | D1 |
| R2 | 33.2K ohms | R17 | 330 ohms ½ W | D2 In 4004 |
| R3 | 68K ohms | R18 | 330 ohms ½ W | D3 In 4738A |
| R4 | 143K ohms | | | D4 IN914 |
| R5 | 280K ohms | | | D5 IN914 |
| R6 | 540K ohms | R21 | 390 ohms | |
| R7 | 7.5K ohms | R22 | 390 ohms | |
| R8 | 2.2K ohms | R23 | 280K ohms | D8 IN914 |
| R9 | 2.2K ohms | R24 | 20K ohms | D9 IN914 |
| R10 | 3.3K ohms | | | |
| R11 | 3.3K ohms | R26 | 5.49K ohms | D11 IN914 |
| R12 | 3.3K ohms | R27 | 8.25K ohms | |
| | | R28 | 390 ohms | C1 470 μf |
| R14 | 3.3K ohms | R29 | 24K ohms | |
| | | R30 | 51K ohms | |
| | | R31 | 30.9K ohms | C4 .001 μf |
| | | | | C5 .1 μf |

Figure 6:
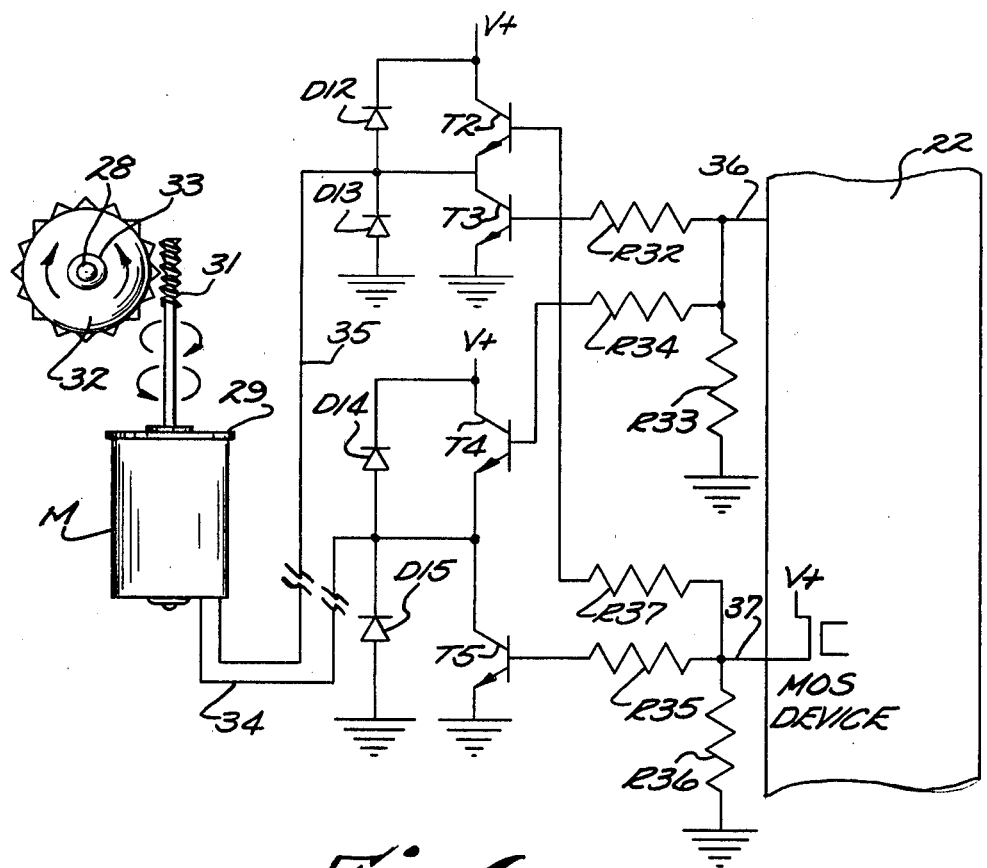
FIG. 6 is a schematic diagram of a mechanism used to provide time display in the FIG. 3 embodiment and time and temperature in the FIG. 4 embodiment.
Figure 7:
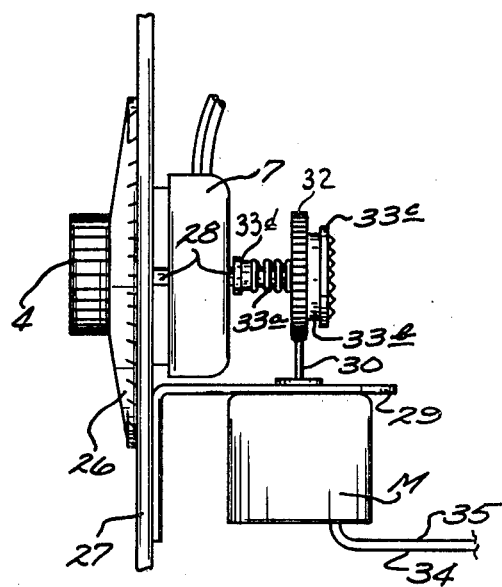
FIG. 7 a sectional view taken on lines 7—7 of FIG. 2.

FIGS. 6–10 are directed to embodiments in which cook data can be fed back and displayed on the data panels shown in FIGS. 1, 2 and 4. As seen in FIG. 7, dial 4 having indicia 26 marked thereon is mounted on one side of bezel 27 on shaft 28. Also mounted on shaft 28 on the opposite side of bezel 27 is potentiometer 7 having a resistance value dependent upon the rotational angle of the dial 4. Also mounted on the same side of bezel 27 as potentiometer 7 is a conventional permanent magnet DC motor M through suitable bracket means 29. Output shaft 30 from motor M is provided with a worm gear 31 which meshes with the teeth of pinion gear 32 which is mounted on shaft 28 through a suitable slip clutch 33 to allow operation of the dial by the oven operator. Slip clutch 33 comprises a clutch spring 33a received on shaft 28 between a spring release 33d and pinion gear 32. Pinion gear 32 is free to rotate relative to shaft 28. A disc 33c is fixedly mounted in the end of shaft 28 with a floating felt fiber clutch disc 33b disposed between gear 32 and disc 33c so that rotation of shaft 28 causes rotation of gear 32 through functional engagement of disc 33c except when the shaft is pushed inwardly moving disc 33C away from gear 32 Motor M is energized through lines 34, 35.

As seen in FIG. 6, NPN transistors T2, T3 are connected with the collector of transistor T2 connected to V+ and its emitter connected to the collector of transistor T3 which emitter is connected to ground. The emitter of transistor T2 is connected to line 35 of motor M with diode D12 connected between V+ and the collector of T3 and diode D13 connected between the emitter of T2 and ground. The base of transistor T3 is connected to an output 36 of microprocessor 22 through resistor R32, and to ground through resistor R33. Output 36 is also connected to the base of NPN transistor T4 through resistor R34. The collector of transistor T4 is connected to V+ and its emitter to the collector of another NPN transistors T5 whose emitter is connected to ground. The emitter of T4 is connected to line 34 of motor M with diode D14 connected between V+ and the collector of transistor T5 and with diode D15 connected between the emitter of transistor T4 and ground. The base of transistor T5 is connected to output 37 of processor 22 through resistor R35 and to ground through resistor R36. Output 37 of processor 22 is also connected to transistor T2 through resistor R37.

Thus when output 36 of processor 22 is on transistor T4 is turned on, conducting current from V+ through line 34 causing motor M to rotate in a given direction with the current going to ground through the collector emitter circuit of transistor T3. When output 37 of processor 22 is on transistor T2 is turned on to conduct current from V+ through line 35 of motor M causing rotation in the opposite direction with the current going to ground through transistor T5. Thus the particular position of dial 4 can be accurately determined in either direction under the control of microprocessor 22. Thus the cook data, either time remaining, or if probe 23 is plugged in, actual temperature can be displayed by the position of shaft 28 and dial 4. As seen in FIG. 2, the time indicia 26 from 0 to 90 is placed on dial 4 with a pointer 38 placed on bezel 27 while in FIG. 4 indicia 39 is located on the bezel with pointer 40 located on dial 4. Thus if the controller is in the time mode once the cooking cycle has been started by pushing the cook button the microprocessor starts a time keeping countdown with reference to the power line frequency. After a selected period of time, e.g. 15 seconds the microprocessor would store the time in a register. The microprocessor would then read the position of potentiometer 7 using the analog to digital converter and compare the time relating the dial 4 position to the time stored in the register. If a difference occurs, the microprocessor will turn on motor M to turn the dial in a counterclockwise direction so that the time remaining is displayed on the panel by matching fixed pointer 38 on the bezel with movable indicia 26 on dial 4. The microprocessor will continue to monitor the potentiometer and will continue to compare the stored time until they match or are within selected limits. The microprocessor will then turn off the motor for a specified time before repeating the procedure until finally zero time remains and the dial 4 would be rotated to the zero position. In this manner the dial would track and thus display cook time remaining.

When probe 23 is inserted and the device is in the temperature mode, the actual temperature is displayed on the panel (FIG. 4) by matching movable pointer 40 with temperature indicia 39 fixed on the bezel. That is, when the temperature probe 23 is plugged in, the operator would rotate the temperature control knob 4 in a clockwise direction until the movable pointer 40 points to the desired temperature on the bezel. When the cook cycle is started by pushing the cook button, the microprocessor reads the position of the potentiometer and stores that temperature as the set point temperature. The processor then turns on motor M to turn dial 4 in a counterclockwise direction until it moves back to the zero position of less than 90° F. on the scale indicated in FIG. 4 (unless the actual food temperature is greater than 90° F.). The microprocessor then monitors the food temperature by means of probe 23. Each time the food temperature increases 5° F. above 90° F. the processor will turn on the motor and rotate dial 4 clockwise and monitor the position of potentiometer 7. When the position of dial 4 matches the food temperature, the processor turns off motor M. Thus the dial 4 will continue to track the actual food temperature in 5° F. increments.

It will be understood that driving means other than motor M can be used if desired to cause movement of dial 4 as desired. For example a bidirectional solenoid 42 shown in FIG. 8 could be used if desired. Sprocket like device 32 fixedly mounted on shaft 28 is adapted to be rotated in either direction under the influence of prongs 43,44. That is, if rod 45 moves upwardly with arm 46 pivoting about shaft 28, prong 44 will engage the teeth of sprocket 32 and rotate it in a counterclockwise direction. Spring 47 biases the mechanism toward a neutral position with prongs 43,44 out of engagement with the sprocket 32. In like manner if rod 45 moves downwardly, prong 43 will engage the teeth of sprocket 32 and cause it to turn in a clockwise direction. As seen in FIG. 9 the direction of movement of rod 45 can be controlled by controlling which of coil 48 and 49 is energized. This motor has the advantage over motor M of FIGS. 6 and 7 in that a slip clutch is not required.

Figure 8:
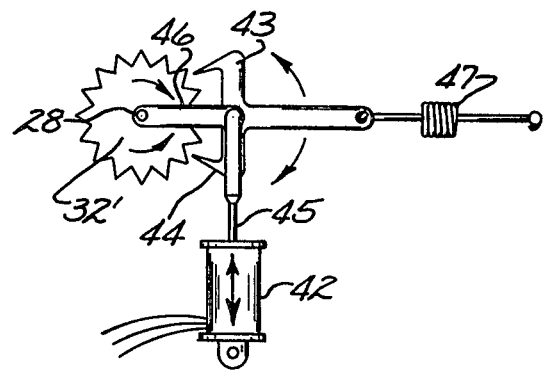
FIGS. 8–10 show alternate embodiments for driving the control knob to display desired information.
Figure 9:
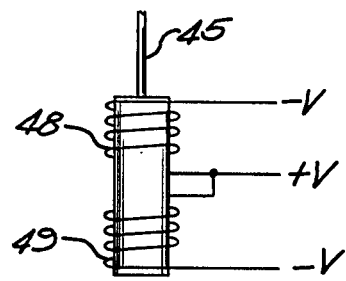
Figure 10:
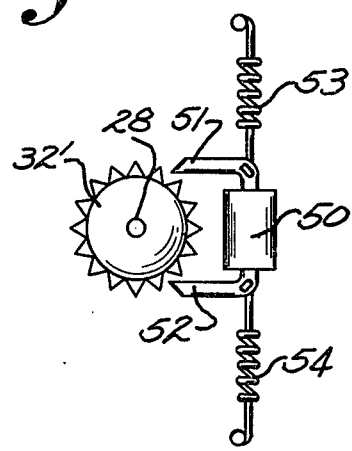

FIG. 10 shows a motor similar to that of FIG. 8 in which solenoid 50 is provided with combination armature-prong elements 51 and 52. Solenoid 50 is suspended between springs 53, 54. Retraction of armature 51 will cause clockwise rotation of sprocket 32 while retraction of armature 52 will cause counterclockwise rotation.

Figure 11:
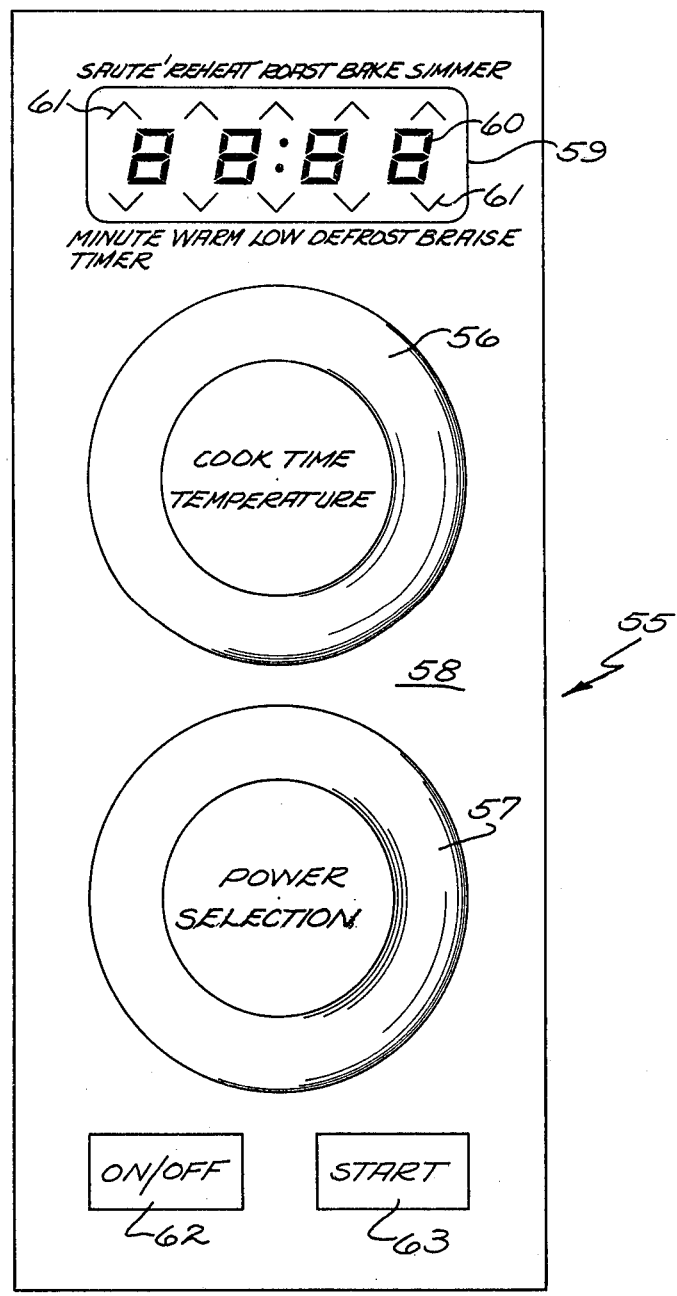
FIG. 11 is a front view of a data input panel having a digital display for an alternative controller embodiment.

In FIG. 11 controller 55 is shown in which time and temperature dial 56 and power selection dial 57 are mounted on bezel 58. No indicia is included on the dials or bezel since a digital display 59 is provided. Display 59 maybe a vacuum flourescent (VF) display comprising a four digit temperature/time portion 60 with characters preferably at least 0.3 inches in height. In the time mode the two digits on the left of the colon as seen in FIG. 11 represents minutes while the two digits on the right of the colon represent seconds. The colon flashes on a timed basis. In the temperature mode, when the temperature probe is inserted, the three digits on the left represent the temperature value while the digit on the right displays an F for farenheit. A row of bars 61 both above and below digit portion 60 are used to indicate the power level corresponding to the position of dial 57. Suitable switches 62 and 63 for energizing the controller and for starting the cook cycle are also mounted on bezel 58.

Rotation of dials 56 and 57 will result in a specific display being presented. The dials are rotated until the particular data that is desired is shown, either time or temperature with dial 56 and power level with dial 57 and then the start switch is pressed to start the cycle. At this point the display timer will start to count down. Not only is the operation of selecting the desired time or temperature and power level significantly easier then with a keyboard data entry system which involves contacting a number of keys in a particular sequence, but the present system offers another advantage not provided in a keyboard entry system. That is, if the oven is used for the same purpose on a repeated basis such as warming soup or defrosting frozen food, the dials can be left in the same position so that all that needs to be done is to have the food inserted and power and start buttons pressed.

Figure 12:
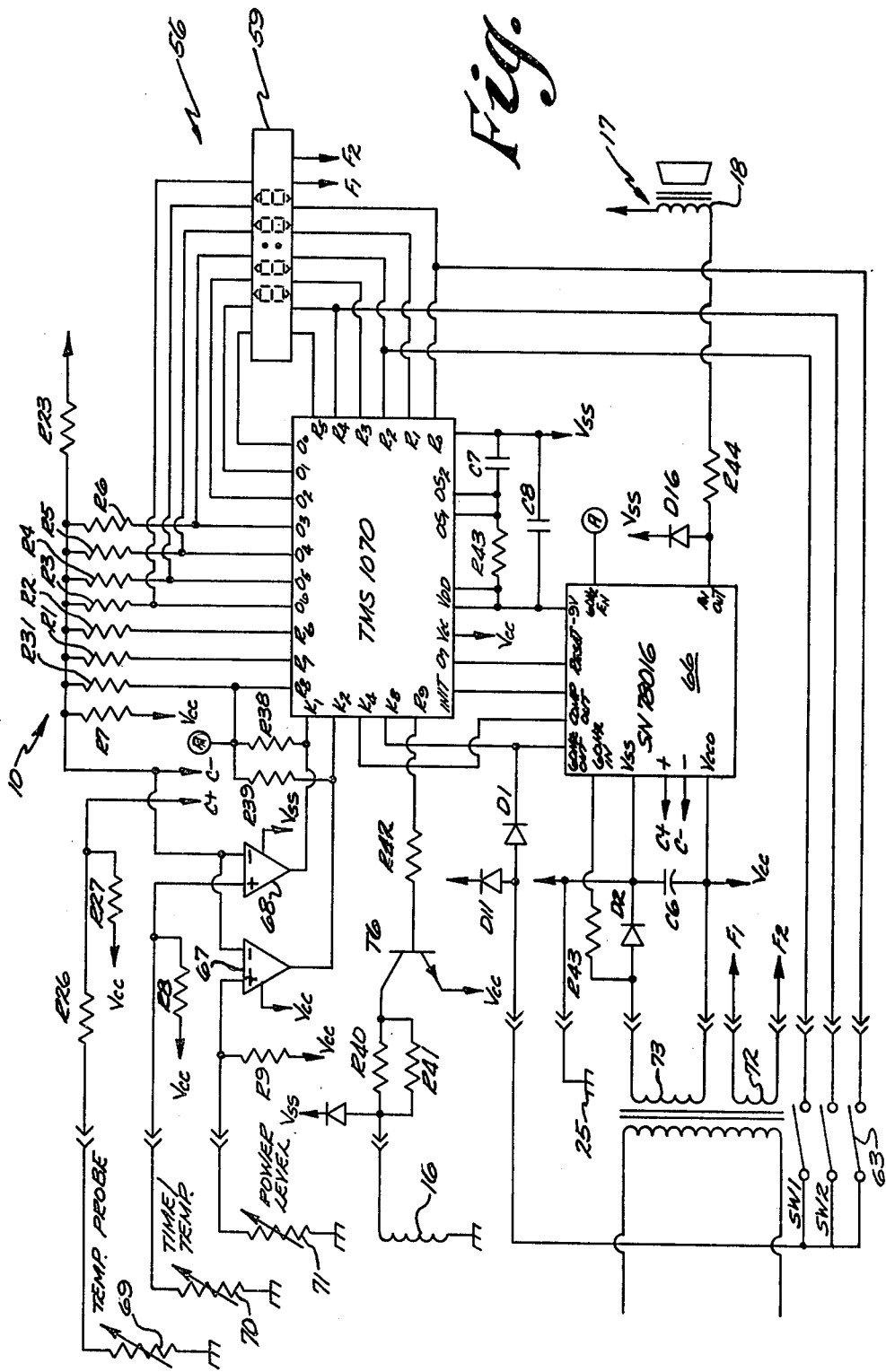
FIG. 12 is a schematic diagram of a controller embodiment employing the FIG. 11 panel.

As seen in FIG. 12, controller 56 comprises a microprocessor 65 in the form of TMS 1070 manufactured by Texas Instruments Incorporated. This is a 1K ROM processor which can directly interface with a VF display which typically requires 26 volts.

An integrated circuit 66 in the form of an SN78017 also manufactured by Texas Instruments Incorporated which is specifically designed for use with microwave oven controls is also used in controller 56. Circuit 66 includes the power supply regulator for the microprocessor as well as the initialization circuit, the 60 Hertz buffering between the transformer and the processor as well as a comparator. Since each of the temperature probe input, temperature/time input and power level input require the use of a comparator, comparators 67, 68 are also included in controller 56 in the form of a dual comparator LM 2903 available from a variety of manufacturers. Probe 69, C+ feeds into the positive input of the comparator circuit C+ of integrated circuit 66. Likewise time/temperature potentiometer 70 (dial 56) is connected to the positive input of comparator 68 and the power level potentiometer 71 (dial 57) is connected to the positive input of comparator 67. The negative input to the comparators are provided in the same manner as in the previous embodiments through an digital to analog converter 10 comprising a divider comprising the resistive ladder R1 to R6 and R7. The outputs of comparators 68, 67 are connected to $K_1$, $K_2$ of processor 65 respectively while output comp of the comparator of IC 66 is connected to $K_4$. $R_8$ of processor 65 is connected to level shift resistor R31 as well as to $K_1$ and $K_2$ through respective resistors R38, R39 and to the enabling input of IC 66 ( Ⓐ ). Thus all the K inputs of processor 65 including $K_8$ connected to the 60 Hertz output of 1C 66 are enabled through the line from $R_8$ as well as the level shift resistor 31. The output lines of processor 65 connected to converter 10, i.e. $O_6$, $O_5$, $O_4$, $O_3$ and to display 59 are multiplexed so that when the converter 10 is enabled, the grid lines leading from $R_5$, $R_4$, $R_3$ along with $R_2$, $R_1$ and $R_0$ are turned off so that the display cannot light up and when the grid lines are on the comparator outputs are not being read. This of course happens more rapidly than can be seen by an observer.

$F_1$ and $F_2$ leads from winding 72 lead to display 59 provide the heater voltage to control the vacuum fluorescent display 59. Although processor 65 is a high voltage processor, it does not have particularly high current capability so that a transistor buffer between it and high voltage relay 16 in the form of NPN transistor T6 is provided. Parallel resistors R40, R41 connected between the collector of transistor T6 and relay 16 serve to distribute power in the circuit board. Resistor R42 is connected between the base of transistor T6 and R9 of processor 65. 60 Hertz is obtained from winding 73 through current limiting resistor R3 to 60 Hertz input of 1C 66. Capacitor C6 connected across winding 73 serves as a filter capacitor for the power supply.

The R lines of processor 65 which drive the grids of display 59 are multiplexed so that they can also be used for switches SW1, SW2, and 63 through $K_8$ of processor 65.

The oscillator circuit of processor 65 includes resistors R43 and capacitor C7. Capacitor C8 connected between $V_{DD}$ and $V_{SS}$ is used as a noise filter.

It will be noted that the oscillator circuit of microprocessor 65 is adapted to use either a crystal external oscillator, an RC or a resistance. The two oscillator lines can be tied together and connected between the resistor and the capacitor as shown however if a crystal or a ceramic resonator is used, it is connected between the two oscillator lines and referenced back to the $V_{SS}$ and $V_{DD}$.

Audio drive 17 is driven directly from an output of IC 66 through resistor R44. A diode D16 is connected between an output of IC 66 and $V_{SS}$, $V_{DD}$ of processor 65 is connected to $-9$ V of IC 66 while $O_7$ of processor 65 is connected to an in of IC 66. The initialization pin of processor 65 is connected to "reset" of 1C 66.

The components used in controller 55 are as follows:

| 65 | TMS 1070 | | | T6 | TIS92 |
|---|---|---|---|---|---|
| 67,68 | LM 2903 | | | | |
| 66 | SN 78017 | | | | |
| 69 | NTC temperature probe with characteristic | | | | |
| | $R_O(T_1) = R_O(T_R)e^B(\frac{1}{T_1} - \frac{1}{T_R})$ | | | | |
| | Where T = $O_K$ | | | | |
| | B = 3950° K. | | | | |
| | R = 50K ohms | | | | |
| | $T_R$ = 25° C. | | | | |
| 70 | 100K potentiometer | | | | |
| 71 | 100K potentiometer | | | | |
| R1 | 15K ohms | D1 | IN914 | C6 | 220 μf |
| R2 | 33.2K ohms | D2 | IN4004 | C7 | 100 pf |
| R3 | 68K ohms | D11 | IN914 | C8 | .1 f |
| R4 | 143K ohms | D16 | IN914 | | |
| R5 | 280K ohms | | | | |
| R6 | 540K ohms | | | | |
| R7 | 7.5K ohms | | | | |
| R8 | 2.2K ohms | | | | |
| R9 | 2.2K ohms | | | | |
| R23 | 280K ohms | | | | |
| R26 | 5.49K ohms | | | | |
| R27 | 8.25K ohms | | | | |
| R38 | 10K ohms | | | | |
| R39 | 10K ohms | | | | |
| R40 | 220 ohms | | | | |
| R41 | 220 ohms | | | | |
| R42 | 10K ohms | | | | |
| R43 | 10K ohms | | | | |
| R44 | 150 ohms | | | | |

Figure 13:
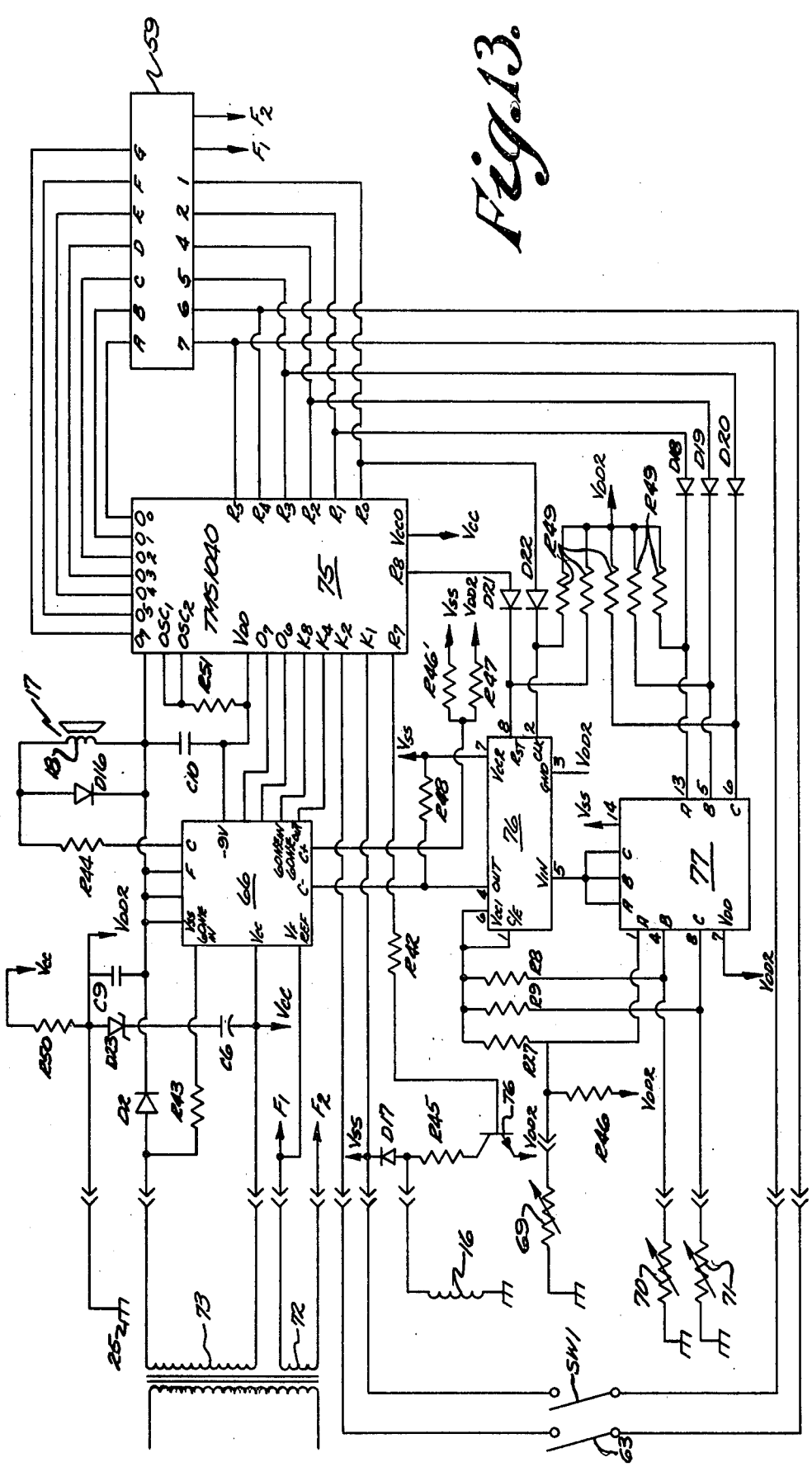
FIG. 13 is a schematic diagram of another controller embodiment employing the FIG. 11 panel.

With reference to FIG. 13 another controller 74 is shown which also employs display 59 shown in FIGS. 11 and 12. In this embodiment a microprocessor 75 comprising a TMS 1040 manufactured by Texas Instruments Incorporated is shown with integrated circuit 66, an SN 78017 as in FIG. 12. Controller 74 also incorporates an eight bit analog to digital converter 76 and a quad C MOS bilateral switch 77. Circuit 76 is an SN 78565 while switch 77 is a CD 4016.

Analog to digital converter 76 has one input, $V_{in}$ (pin 5) with switch 77 used to multiplex the inputs from the temperature probe 69, the time/temperature potentiometer 70 and the power level potentiometer 71 which are connected respectively to pins 1, 4, and 8 of switch 77. These inputs are selected one at a time under the control of microprocessor 75 and fed into $V_{in}$ of converter 76. The output of converter 76 is fed through the comparator C— of circuit 66 and is fed into $K_4$ of processor 75. The TMS 1040 processor is provided with internal pull downs for the VF display.

$K_1$ and $K_2$ of processor 75 are connected respectively with switches SW1 (door switch) and 63 (start switch) and are multiplexed in lines leading to $R_4$ and $R_5$ of processor 75 and to display 59. Transistor T6 is provided as a buffer between high voltage relay 16 and $R_7$ of processor 75 as in the FIG. 12 embodiment. Resistor R45 is connected between the collector of the transistor and relay 16 with diode D17 placed between $V_{SS}$ and the relay.

Resistor R46 is connected between probe 69 and $V_{DD2}$. Resistor R27, R9 and R8 form voltage dividers with probe 69, and potentiometers 70, 71 respectively as in the previous embodiments and are connected between pins 1, 4 and 8 of switch 77 and $V_{CC1}$ of converter 76. The positive input C+ of circuit 66 is connected to a voltage divider comprising resistors R46' and R47. Resistor R46' is connected to $V_{SS}$ while resistor R47 is connected to $V_{DD2}$. The negative input C— of circuit 66 comparator is connected to pin 4 output of converter 76 as well as to $V_{CC2}$ (pin 7) of converter 76 through resistor R48.

Resistors R49, all 100K ohm resistors are respectively connected between $V_{DD2}$ and pin 2 (CLK) of converter 76, pin 8 (RST) of converter 76 and pins 6, 5, and 13 (C,B,A) of switch 77. Pins 13, 5, and 6 are also connected through respective diodes D18, D19, and D20 to R pins of processor 75 and to display 59 to permit multiplexing between the data inputs and the display. Diodes D21, D22 are placed between pin 8 converter 76 and R8 of processor 75 and pin 2 of converter 76 and pin $R_0$ of processor 75 respectively. Pins $R_0$ through $R_5$ of processor 75 are connected to display 59 (pins 1-7 respectively) while pins $O_0$ through $O_5$ and $O_7$ processor 75 are connected to pins A to G of display 59.

Leads $F_1$ and $F_2$ from winding 72 are connected to $F_1$, $F_2$ respectively of display 59 to provide filament current. The power supply from winding 73 includes capacitor C6 connected across the winding with one plate connected to $V_{cc}$ and the other to zener diode D23, the other side of which is connected to $V_{cc}$ through resistor R50 and is grounded to chassis 25. Capacitor C9 is connected across diode D23. Zener diode D23 is used to set up voltage $V_{DD2}$ to operate the CMOS switch 77 and converter 76 (i.e. 9 volt supply).

Annunicator 17 is driven from pin C of circuit 66 being connected through resistor R14 with diode D16 connected across coil 18.

Capacitor C10 is connected between $V_{SS}$ and $V_{DD}$ of processor 75 with $OSC_1$ and $OSC_2$ tied together and connected to $V_{DD}$ through resistor R51.

The purpose of diodes D21, D22, D18, D19, D20 and pull down resistors R49 is to provide a suitable interface between the high voltage (i.e. 26 V) of display 59 and the low voltage (9 V) of converter 76 and switch 77.

The "$V_FREF$" is used to bias the display grid voltage of the display more negative than the filament voltage to ensure that current stops flowing when a digit is turned off.

The components used in the controller 74 are as follows.

| 75 | TMS 1040 | | |
|---|---|---|---|
| 59 | Futaba 4MTO7 or electrical equivalent | | |
| 66 | SN 78017 | | |
| 76 | SN 78565 | | |
| 77 | CD 4016 | | |
| T6 | TIS92 | | |
| R27 | 8.45K ohms | D17 | IN914 |
| R42 | 10K ohms | C6 | 470 uf |
| R43 | 100K ohms | C10 | .1 uf |
| R44 | 120 ohms | C9 | .1 uf |
| R45 | 120 ohms | | |
| R46[1] | 100K ohms | D16 | IN914 |
| R47 | 100K ohms | D23 | IN4739A |
| R48 | 100K ohms | D2 | IN4004 |
| R9 | 4.7K ohms | D21 | IN914 |
| R8 | 4.7K ohms | D22 | IN914 |
| R46 | 28K ohms | D18 | IN914 |
| R49 | 100K ohms | D19 | IN914 |
| R51 | 47K ohms | D20 | IN914 |

In all of the above embodiments an extremely effective yet simple way has been shown to enter information into a controller using a potentiometer to provide an analog signal and converting that to a digital input to the microprocessor. The potentiometer has also been used in an effective manner to provide display information.

Undoubtedly numerous variations and modifications of the invention will become readily apparent to those familiar with microwave ovens and microwave oven controls. However the invention should not be considered as limited to the specific embodiments depicted, but rather as defined in the claims appended hereto.

I claim:

1. Microwave oven control apparatus comprising:
digital electronic processing means having data inputs representative of selected parameters for providing an output based on said parameters,
power supply means for said processing means,
a comparator circuit having first and second inputs and an output,
a first voltage divider comprising a fixed resistor coupled to a potentiometer, the voltage generated by the voltage divider fed to the first input of the comparator, and being representative of a selected parameter,
a second voltage divider comprising a fixed resistor coupled to a binary weighted resistor ladder, and means generating a voltage in the second voltage divider by enabling in turn the resistors of the ladder and feeding the voltage generated in the second voltage divider to the second input of the comparator, the comparator switching from one value to another upon the enablement of one of the resistors of the ladder, and
the output of the comparator connected to the processing means, a second comparator circuit having first and second inputs and an output,
a third voltage divider comprising a fixed resistor coupled to another potentiometer, the voltage generated by the third voltage divider fed to the first input of the second comparator and being representative of a selected parameter,
the voltage generated in the second voltage divider by enabling in turn the resistors of the ladder fed to the second input of the second comparator, the comparator switching from one value to another upon the enablement of one of the resistors of the ladder, and
the output of the second comparator connected to the processing means.

2. Microwave oven control apparatus according to claim 1 further including a temperature dependent resistor connectable to the processing means, the temperature dependent resistor connectable to a fixed resistor to form a temperature dependent voltage divider,
a third comparator circuit having first and second inputs and an output,
the voltage generated by the temperature dependent resistor fed to the first input of the third comparator,
a voltage generated in the second voltage divider by enabling in turn the resistors of the ladder and feeding the voltage generated in the second voltage divider to the second input of the third comparator, the comparator switching from one value to another upon the enablement of one of the resistors of the ladder, and
the output of the third comparator connected to the processing means.

3. Microwave oven control apparatus according to claim 2 in which adder resistor means is coupled to the resistor ladder to enable the processor means to read the input data as temperature data when the temperature dependent resistor is connected to the processing means and as time data when the temperature dependent resistor is not connected to the processing means.

* * * * *